US012108764B2

(12) United States Patent
Chanda et al.

(10) Patent No.: US 12,108,764 B2
(45) Date of Patent: Oct. 8, 2024

(54) GROWTH-INDEPENDENT INHIBITION OF AFLATOXIN BIOSYNTHESIS WITH SELECTED NANOPARTICLES

(71) Applicant: University of South Carolina, Columbia, SC (US)

(72) Inventors: Anindya Chanda, Lexington, SC (US); Jamie Lead, Irmo, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 509 days.

(21) Appl. No.: 15/911,327

(22) Filed: Mar. 5, 2018

(65) Prior Publication Data

US 2018/0255784 A1 Sep. 13, 2018

Related U.S. Application Data

(60) Provisional application No. 62/466,520, filed on Mar. 3, 2017.

(51) Int. Cl.
*A01N 59/16* (2006.01)
*A01N 25/28* (2006.01)

(52) U.S. Cl.
CPC ............ *A01N 59/16* (2013.01); *A01N 25/28* (2013.01)

(58) Field of Classification Search
CPC ................................ A01N 59/16; A01N 25/28
See application file for complete search history.

(56) References Cited

PUBLICATIONS

Mousavi et al. Iran J Med Sci. 2015; 40(6): 501-506. (Year: 2015).*
Tejamaya et al. Environ Sci Technol. 2012; 46: 7011-7017. (Year: 2012).*
Afshinnia et al., "Effect of Nanomaterial and Media Physicochemical Properties on Ag NM Aggregation of Kinetics", Journal of Colloid and Interface Science, 487, 2017. pp. 192-200.
Afshinnia et al., "The Concentration-Dependent Aggregation of Ag NPs Induced by Cystine", Science of the Total Environment, 557-558, 2016, pp. 395-403.
Al-Othman et al., "Application of Silver Nanoparticles as Antifungal and Antiflatoxin B1 Produced by *Aspergillus flavus*", Digest Journal of Nanomaterials and biostructures, 9-1, 2014, pp. 151-157.
Allahverdiyev et al., "Antimicrobial Effects of TiO2 and Ag2) Nanoparticles Against Drug-Resistant Bacteria and *leishmania* Parasites", Future Microbiology Review, 6-8, 2011, pp. 933-940.
Baalousha et al., "Effect of Monovalent and Divalent Cations, Anions, and Fulvic Acid on Aggregation of Citrate-Coated Silver Nanoparticles", Science of the total Environment, 454-455, 2013, pp. 119-131.
Baidya et al., "VeA Is Associated With the Response to Oxidative Stress in the Aflatoxin-Producer *Aspergillus flavus*", Eukaryotic Cell, 13-8, 2014, pp. 1095-1103.
Banerjee et al., "Quantitative Acoustic Contrast Tomography Reveals Unique Multiscale Physical Fluctuations During Aflatoxin Synthesis in *Aspergillus parasiticus*", Fungal Genetics and Biology, 73, 2014. pp. 61-68.
Bayram et al., "BeIB/VeA/LaeA Complex Coordinates Light Signal with Fungal Development and Secondary Metabolism", Science, 320, 2008, pp. 1504-1506.
Beddow et al., "Effects of Engineered Silver Nanoparticles on the Growth and Activity of Ecologically Important Microbes" Environmental Microbiology Reports, 6-5, 2014, pp. 448-458.
Beddow et al., "Nanosilver Inhibits Nitrification and Reduces Ammonia-Oxidising Bacterial but not Archaeal amoA Gene Abundance in Estuarine Sediments", Environmental Microbiology, 19-2, 2017, pp. 500-510.
Bonevich et al., "Measuring the Size of Nanoparticles Using Transmission Electron Microscopy (TEM)", NIST-NCL Joint Assay Protocol, 2010, PCC-7 Version.
Chanda et al., "A Key Role for Vesicles in Fungal Secondary Metabolism", Proceedings of the National Academy of Sciences of the United States of America, 106-46, 2009, pp. 19533-19538.
Chang et al., "Loss of msnA, a Putative Stress Regulatory Gene, in *Aspergillus parasiticus* and *Aspergillus flavus* Increased Production of Conidia, Aflatoxins and Kojic Acid", Toxins, 3, 2011, pp. 82-104.
Chatzimitakos et al., "Qualitative Alterations of Bacterial Metabolome After Exposure to Metal Nanoparticles with Bactericidal Properties: A Comprehensive Workflow Based on 1H NMR, UHPLC-HRMS, and Metabolic Databases", Journal of Proteome Research, 15-9, 2016, pp. 3322-3330.
Cumberland et al., "Particle Size Distributions of Silver Nanoparticles at Environmentally Relevant Conditions", Journal of Chromatography A, 1216, 2009, pp. 9099-9105.
El-Desouky et al., "Honey Mediated Silver Nanoparticles and their Inhibitory Effect on Aflatoxins and Ochratoxin A", Journal of Applied Pharmaceutical Science, 6-06, 2016, pp. 083-090.
Fabrega et al., "Silver Nanoparticles: Behaviour and Effects in the Aquatic Environment", Environment International, 37, 2011, pp. 517-531.
Fabrega et al., "Silver Nanoparticle Impact on Bacterial Growth: Effect of pH, Concentration, and Organic Matter", Environmental Science and Technology, 43-19, 2009, pp. 7285-7290.

(Continued)

*Primary Examiner* — David Browe
(74) *Attorney, Agent, or Firm* — DORITY & MANNING, P.A.

(57) ABSTRACT

Methods for inhibiting fungal secondary metabolisms are described. Secondary metabolisms inhibited by the methods can include those responsible for expression of mycotoxins such as aflatoxin. Methods can include inhibition of aflatoxin production without inhibiting fungal growth by contacting a fungus with a suspension including silver nanoparticles that can include a surface coating. The methods can be utilized in preventing fungal-caused destruction of plant species (e.g., crop species). Disclosed methods encompass utilization of silver nanoparticles at low concentrations of from about 10 picograms per liter to about 1 microgram per liter.

13 Claims, 15 Drawing Sheets

Specification includes a Sequence Listing.

(56) References Cited

PUBLICATIONS

Fridovich, Irwin, “Superoxide Dismutates” Annual Review of Biochemistry, 44, 1975, pp. 147-159.
Gummadidala et al., “Aflatoxin-Exposure of *Vibrio gazogenes* as a Novel System for the Generation of Aflatoxin Synthesis Inhibitors”, Frontiers in Microbiology, 7-814, 2016.
Hong et al., “Evidence that a Transcription Factor Regulatory Network Coordinates Oxidative Stress Response and Secondary Metabolism in *Aspergilli”,* Microbiology Open, 2-1, 2013. pp. 144-160.
Hong et al., “Oxidative Stress-Related Transcription Factors in the Regulation of Secondary Metabolism”, Toxins, 5, 2013, pp. 683-702.
Huang et al., “An Evaluation og Blood Compatibility of Silver Nanoparticles”, Scientific Reports, 6-25518, 2016.
Jo et al., “Antifungal Activity of silver Ions and Nanoparticles on Phytopathogenic Fungi”, Plant Disease, 93-10, 2009, pp. 1037-1043.
Ju-Nam et al., “Manufactured Nanoparticles: An Overview of their Chemistry, Interactions and Potential Environmental Implications”, Science Direct, 400, 2008, pp. 396-414.
Kadar et al., “Colloidal Stability of Nanoparticles Derived from Simulated Cloud-Processed Mineral Dusts”, Science of Total Environment, 466-467, 2014, pp. 864-870.
Kathiravan et al., “Green Synthesis of Silver Nanoparticles Using *Croton sparsiflorus morong* Leaf Extract and Their Antibacterial and Antifungal Activities”, Spectrochimica Acta Part A: Molecular and Biomolecular Sprectroscopy, 139, 2005, pp. 200-205.
Keller et al., “Fungal Secondary Metabolism—From Biochemistry to Genomics”, Nature Reviews, Microbiology, 3-12, 2005, pp. 937-947.
Kim et al., “Antimicrobial Effects of Silver Nanoparticles”, Nanomedicine: Nanotechnology, Biology, and Medicine, 3, 2007, pp. 95-101.
Kim et al., “Citrate Coated Silver Nanoparticles Change Heavy Metal Toxicities and Bioaccumulation of *Diaphnia magna”,* Chemosphere, 143, 2016, pp. 99-105.
Liang et al., “Characterization of the Function of the ver-1A and ver-IB Genes, Involved in Aflatoxin Biosynthesis in *Aspergillus parasiticus”,* Applied and Environmental Macrobiology, 62-12, 1996, pp. 4568-4575.
Lowry et al., “Transformations of Nanomaterials in the Environment”, Environmental Science and Technology, 46-13, 2012, pp. 6893-6899.
Lunov et al., “Lysosomal Degradation of the Carboxydestran Shell of coated Superparamagnetic Iron Oxide Nanoparticles and the Fate of Professional Phagocytes”, Biomaterials, 31, 2010, pp. 9015-9022.
Maiorano et al., “Effects of Cell Culture Media on the Dynamic Formation of Protein—Nanoparticle Complexes and Influence on the Cellular Response”, ACS Nano, 4-12, 2010, pp. 7481-7491.
Merrifield et al., “Single-Particle Inductively Coupled Plasma Mass Spectroscopy Analysis of Size and Number Concentration in Mixtures of Monometallic and Bimetallic (Core-Shell) Nanoparticles”, Talanta, 162, 2017, pp. 130-134.
Milic et al., “Cellular Uptake and Toxicity Effects of Silver Nanoparticles in Mammalian Kidney Cells”, Journal of Applied Toxicology, 35-6, 2015, pp. 581-592.
Montibus et al., “Coupling of Transcriptional Response to Oxidative Stress and Secondary Metabolism Regulation in Filamentous Fungi”, Critical Reviews in Microbiology, 2013.
Montibus et al., “The bZIP Transcription Factor Fgap1 Mediates Oxidative Stress Response and Trichothecene Biosynthesis But Not Virulence in *Fusarium graminearum”,* PLOSOne, 8-12, 2013, e83377.
Moore et al., “Nanoparticle Colloidal Stability in Cell Culture Media and Impact on Cellular Interactions”, Chemical Society Reviews, 44, 2015, pp. 6287-6305.
Mousavi et al., “Inhibitory Effects of Silver Nanoparticles on Growth and Aflatoxin B1 Production by *Aspergillus parasiticus”,* International Journal of Molecular Sciences, 40-6, 2015, pp. 501-506,.
Nasrollahi et al., “Antifungal Activity of silver Nanoparticles on Some of Fungi”, International Journal of Nano Dimension, 1-3, 2011, pp. 233-239.
Navarro et al., “Effects of Differently Coated Silver Nanoparticles on the Photosynthesis of *Chlamydomonas reinhardtii”,* Environmental Science and Technology, 49-13, 2015, pp. 8041-8047.
Pal et al., “Does the Antibacterial Activity of Silver Nanoparticles Depend on the Shape of the Nanoparticle? A Study of the Gram-Negative Bacterium *Escherichia coli”,* Applied and environmental Biology, 73-6, 2007, pp. 1712-1720.
Panacek et al., “Antifungal Activity of Silver Nanoparticles Against *Candid* spp.” Biomaterials, 30, 2009, pp. 6333-6340.
Panacek et al., “Silver Colloid Nanoparticles: Synthesis, Characterization, and Their Antibacterial Activity”, The Journal of Physical Chemistry B, 110, 2006, pp. 16248-16253.
Park et al., “Toxicity of Citrate-Coated Silver Nanoparticles Differs According to Method of Suspension Preparation”, Bulletin of Environmental Contamination Toxicology, 93, 2014, pp. 53-59.
Park et al., “Bioavailability and Toxicokinetics of Citrate-Coated Silver Nanoparticles in Rats”, Archives of Pharmacal Research, 34-1, 2011, pp. 153-158.
Patra et al., “Subsurface Pressure Profiling: A Novel Mathematical Paradigm for Computing Colony Pressures on Substrate During Fungal Infections”, Scientific Reports, 5, 2015, 12928.
Pietrzak et al., “Influence of Silver Nanoparticles on Metabolism and Toxicity of Moulds”, Acta Biochimica Polonica, 62-4, 2015, pp. 851-857.
Pulit et al., “Nanosilver Against Fungi. Silver Nanoparticles as an Effective Biocidal Factor”, Acta Biochimica Polonica, 60-4, 2013. pp. 795-798.
Rai et al., “Silver Nanoparticles as a New Generation of Antimicrobials”, Biotechnology Advances, 27, 2009, pp. 76-83.
Reverberi et al., “Aoyap1 Regulates OTA Synthesis by Controlling Cell Redox Balance in *Aspergillus ochraceus”,* Applied Microbiology and Biotechnology, 95, 2012, pp. 1293-1304.
Reverberi et al., “Apyap1 Affects Aflatoxin Biosynthesis During *Aspergillus parasiticus* Growth in Maize Seeds”, Food Additives and Contaminants, 24-10, 2007, pp. 1070-1075.
Romer et al., “Aggregation and Dispersion of silver Nanoparticles in Exposure Media for Aquatic Toxicity Tests”, Journal of Chromatography A, 1218, 2011, pp. 4226-4233.
Roze et al., “The Initiation and Pattern of Spread of Histone H4 Acetylation Parallel the Order of Transcriptional Activation of Genes in the Aflatoxin Cluster”, Molecular Microbiology, 66-3, 2007, pp. 713-726.
Roze et al., “Stress-Related Transcription Factor AtfB Integrates Secondary Metabolism with the Oxidative Stress Response in Aspergilli”, The Journal of Biological Chemistry, 286-40, 2011, pp. 35137-35148.
Sarikaya-Bayram et al., “One Juliet and Four Romeos: VeA and Its Methyltransferases”, Frontiers in Microbiology, 6, 2015.
Taylor et al., “Molecular Toxicity of Cerium Oxide Nanoparticles to the Freshwater Alga *Chlamydomonas reinhardtii* is Associated with Supra-Environmental Exposure Concentrations”, Nanotoxicity, 10-1, 2016, pp. 3322-3330.
Tejamaya et al., “Stability of Citrate, PVP, and PEG Coated Silver Nanoparticles in Ecotoxicology Media”, Environmental Science and Technology, 46-13, 2012, pp. 7011-7017.
Topuz et al., “Toxicokinetics and Toxidynamics of Differently Coated silver Nanoparticles and Silver Nitrate in *Enchytraeus crypticus* Upon Aqueous Exposure in an Inert Sand Medium”, Environmental Toxicology and Chemistry, 34-12, 2015, pp. 2816-2823.
Xiu et al., “Negligible Particle-Specific Antibacterial Activity of Silver Nanoparticles”, Nano Letters 12-8, 2012, pp. 4271-4275.
Yin et al., “bZIP Transcription Factors Affecting Secondary Metabolism, Sexual Development and Stress Responses in *Aspergillus nidulans”,* Microbiology, 159, 2013, pp. 77-88.

(56) References Cited

PUBLICATIONS

Yu et al., "Clustered Pathway Genes in Aflatoxin Biosynthesis", Applied and Environmental Microbiology, 70-3, 2004, pp. 1253-1262.
Zhang et al., "Cytotoxic Potential of Silver Nanoparticles", Yonsei Medical Journal, 55-2, 2014, pp. 283-291.
Zook et al., "Measuring Silver Nanoparticles Dissolution in Complex Biological and Environmental Matrices Using UV-Visible Absorbance", Analytical and Bioanalytical Chemistry, 401, 2011, pp. 1993-2002.

* cited by examiner

SEQUENCE LISTING

```
<160> NUMBER OF SEQ ID NOS: 26

<210> SEQ ID NO 1
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 1

acctcatgct cataccgagg                                                20


<210> SEQ ID NO 2
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 2

gaagacaggg tgctttgctc                                                20


<210> SEQ ID NO 3
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 3

cacttagcca gcacgatcaa                                                20


<210> SEQ ID NO 4
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 4

atgatcatcc gactgccttc                                                20


<210> SEQ ID NO 5
<211> LENGTH: 20
```

<212> TYPE: DNA
<213> ORGANISM: Artificial Sequence
<220> FEATURE:
<223> OTHER INFORMATION: Description of Artificial Sequence: Synthetic primer

<400> SEQUENCE: 5
aacactcgtg gccagttctt 20

<210> SEQ ID NO 6
<211> LENGTH: 20
<212> TYPE: DNA
<213> ORGANISM: Artificial Sequence
<220> FEATURE:
<223> OTHER INFORMATION: Description of Artificial Sequence: Synthetic primer

<400> SEQUENCE: 6
atatactccc gcgacacagc 20

<210> SEQ ID NO 7
<211> LENGTH: 20
<212> TYPE: DNA
<213> ORGANISM: Artificial Sequence
<220> FEATURE:
<223> OTHER INFORMATION: Description of Artificial Sequence: Synthetic primer

<400> SEQUENCE: 7
cgaagccact ggtagaggag 20

<210> SEQ ID NO 8
<211> LENGTH: 20
<212> TYPE: DNA
<213> ORGANISM: Artificial Sequence
<220> FEATURE:
<223> OTHER INFORMATION: Description of Artificial Sequence: Synthetic primer

<400> SEQUENCE: 8
acgaatgtca tgctccatca 20

<210> SEQ ID NO 9
<211> LENGTH: 20
<212> TYPE: DNA
<213> ORGANISM: Artificial Sequence
<220> FEATURE:
<223> OTHER INFORMATION: Description of Artificial Sequence: Synthetic primer

<400> SEQUENCE: 9
tggatagggc tctcgctaaa 20

<210> SEQ ID NO 10
<211> LENGTH: 20
<212> TYPE: DNA
<213> ORGANISM: Artificial Sequence
<220> FEATURE:
<223> OTHER INFORMATION: Description of Artificial Sequence: Synthetic primer

<400> SEQUENCE: 10
ctcctgttgc acgattctga 20

<210> SEQ ID NO 11
<211> LENGTH: 20
<212> TYPE: DNA

```
<213> ORGANISM: Artificial Sequence
<220> FEATURE:
<223> OTHER INFORMATION: Description of Artificial Sequence: Synthetic
      primer

<400> SEQUENCE: 11

tctccaagat ccgtgaggag                                                20


<210> SEQ ID NO 12
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 12

ttcaggtcac cgtaagaggg                                                20


<210> SEQ ID NO 13
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 13

tccagctatc ccaagaatgg                                                20


<210> SEQ ID NO 14
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 14

taatcccccg atagagcctt                                                20


<210> SEQ ID NO 15
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 15

atggggtgtg gaagtgtgat                                                20


<210> SEQ ID NO 16
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 16

atcggtaaaa ccagcctcct                                                20


<210> SEQ ID NO 17
<211> LENGTH: 20
<212> TYPE: DNA
<213> ORGANISM: Artificial Sequence
```

<220> FEATURE:
<223> OTHER INFORMATION: Description of Artificial Sequence: Synthetic
primer

<400> SEQUENCE: 17
gagatggcct ccgtattcaa 20

<210> SEQ ID NO 18
<211> LENGTH: 20
<212> TYPE: DNA
<213> ORGANISM: Artificial Sequence
<220> FEATURE:
<223> OTHER INFORMATION: Description of Artificial Sequence: Synthetic
primer

<400> SEQUENCE: 18
catcaatcct tccctctcca 20

<210> SEQ ID NO 19
<211> LENGTH: 20
<212> TYPE: DNA
<213> ORGANISM: Artificial Sequence
<220> FEATURE:
<223> OTHER INFORMATION: Description of Artificial Sequence: Synthetic
primer

<400> SEQUENCE: 19
ccacatcaac cactccctct 20

<210> SEQ ID NO 20
<211> LENGTH: 20
<212> TYPE: DNA
<213> ORGANISM: Artificial Sequence
<220> FEATURE:
<223> OTHER INFORMATION: Description of Artificial Sequence: Synthetic
primer

<400> SEQUENCE: 20
tcctgatcct tcgtcgaaac 20

<210> SEQ ID NO 21
<211> LENGTH: 20
<212> TYPE: DNA
<213> ORGANISM: Artificial Sequence
<220> FEATURE:
<223> OTHER INFORMATION: Description of Artificial Sequence: Synthetic
primer

<400> SEQUENCE: 21
gaggccggag atatttcaca 20

<210> SEQ ID NO 22
<211> LENGTH: 20
<212> TYPE: DNA
<213> ORGANISM: Artificial Sequence
<220> FEATURE:
<223> OTHER INFORMATION: Description of Artificial Sequence: Synthetic
primer

<400> SEQUENCE: 22
ccctctttgc tcttcgacac 20

<210> SEQ ID NO 23
<211> LENGTH: 20
<212> TYPE: DNA
<213> ORGANISM: Artificial Sequence
<220> FEATURE:

-continued

```
<223> OTHER INFORMATION: Description of Artificial Sequence: Synthetic
      primer

<400> SEQUENCE: 23

cctccttgca atacaaccgt                                              20


<210> SEQ ID NO 24
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 24

gtcttccttc gcctcttcct                                              20


<210> SEQ ID NO 25
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 25

caccagttcg gtgacaacac                                              20


<210> SEQ ID NO 26
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 26

gtgttcacta cggccaaggt                                              20
```

GROWTH-INDEPENDENT INHIBITION OF AFLATOXIN BIOSYNTHESIS WITH SELECTED NANOPARTICLES

CROSS REFERENCE TO RELATED APPLICATION

This application claims filing benefit of U.S. Provisional Patent Application Ser. No. 62/466,520 having a filing date of Mar. 3, 2017, which is incorporated herein by reference for all purposes.

SEQUENCE LISTING

The instant application contains a Sequence Listing which has been submitted electronically in ASCII format and is hereby incorporated by reference in its entirety. Said ASCII copy, created on May 15, 2018, is named USC-552(1253)_SL.txt and is 6,195 bytes in size.

BACKGROUND

Silver nanoparticles (Ag NPs) are one of the most studied manufactured nanoparticles due to their antimicrobial properties and their efficacy in controlling diverse and multi-drug resistant microbes. They are generally preferred to silver ions due to their lower mammalian cytotoxicity, along with their ease of synthesis and use. However, as popularity of Ag NPs continues to increase in medicine, pharmaceutical, cosmetics, electronics and diverse other consumer product industries, additional studies on their effects on microbial metabolism are essential to comprehensively judge their beneficial effects on, for instance, food preservation as well as their potential harmful impact on environmental health.

To this end, a significant number of studies have shown that Ag NPs can alter the metabolite profiles in bacteria and algae either through growth inhibitory or hormetic effects. Multiple studies conducted on fungal strains suggest that Ag NPs also produce antifungal effects and can repress their secondary metabolite synthesis as well. However, while these studies have all focused on growth-dependent repression of secondary metabolism, the growth-independent effects of Ag NPs on fungal secondary metabolism remain unclear.

What is needed in the art are methods for utilization of NPs against microbial cells at doses that repress undesirable secondary metabolism, but that are not growth inhibitory.

SUMMARY

According to one embodiment, disclosed are methods for inhibiting secondary metabolism of a fungus. More specifically, a method can include contacting a fungus with a composition including silver nanoparticles at a concentration of about 50 nanomolar or less. Beneficially, a method can inhibit secondary metabolism, e.g., production of a mycotoxin, e.g., aflatoxin, in a temporary and non-lethal approach. Disclosed methods can be particularly beneficial for use with fungal plant pathogens such as mycotoxin producing filamentous fungi.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

DETAILED DESCRIPTION

Figure 1:
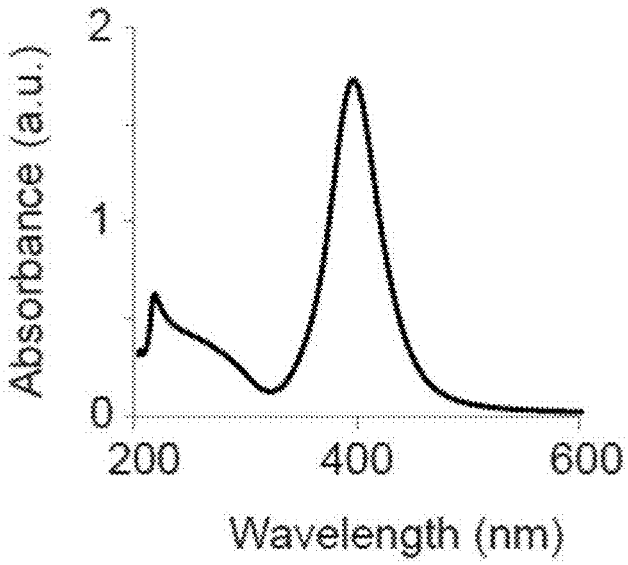
FIG. 1 provides a UV-Vis spectral profile of a citrate-coated silver nanoparticle (cit-Ag NPs) stock solution.

Reference now will be made to embodiments of the disclosed subject matter, one or more examples of which are set forth below. Each example is provided by way of an explanation of the subject matter, not as a limitation thereof. In fact, it will be apparent to those skilled in the art that various modifications and variations can be made in the disclosed embodiments without departing from the scope or spirit of the subject matter. For instance, features illustrated or described as one embodiment can be used on another embodiment to yield still a further embodiment. Thus, it is intended that the present disclosure cover such modifications and variations as come within the scope of the appended claims and their equivalents. It is to be understood by one of ordinary skill in the art that the present discussion is a description of exemplary embodiments only, and is not intended as limiting the broader aspects of the presently disclosed subject matter, which broader aspects are embodied exemplary constructions.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the prefix "nano" refers to the nanometer scale up to about 100 nm. For example, particles having an average diameter on the nanometer scale (e.g., from about 0.1 nm to about 100 nm) are referred to as "nanoparticles."

As utilized herein, the term "secondary metabolism" and "secondary metabolites" refer to organic compounds that are produced by an organism but are not directly involved in the normal growth, development, or reproduction of an organism.

In general, disclosed herein are methods for inhibiting fungal secondary metabolisms that can be responsible for expression of mycotoxins. Beneficially, disclosed methods can provide desirable inhibition of secondary metabolisms without inhibiting fungal growth. As such, the methods can be utilized in preventing fungal-caused destruction of plant species (e.g., crop species) without undesirable consequences to plant health and local environments due to complete destruction of the fungal presence and growth. Beneficially, disclosed methods encompass utilization of silver nanoparticles in inhibition of secondary metabolism at concentrations that are much lower than those typically used in toxicological and ecotoxicological studies.

Disclosed methods can serve to elucidate the biological behaviors of fungi at sublethal doses, which is necessary to understand whether fungi, and specifically, the mycotoxin producers, which are very resistant to harsh conditions in the environment, alter their metabolic profiles in response to silver nanoparticles. Disclosed methods are thus beneficial in the evaluation of the impact of nanoparticle accumulation on ecological physiology and human health.

Disclosed methods are demonstrated herein using the plant pathogen, *Aspergillus parasiticus*, which is a known model for studying fungal secondary metabolism, but are equally applicable to other known fungal plant pathogens. For instance, disclosed methods are applicable for use in conjunction with mycotoxin producing filamentous fungi including. *Aspergillus parasiticus* is a filamentous fungus that synthesizes aflatoxin B1, a carcinogenic mycotoxin that contaminates billions of dollars' worth of crops worldwide including corn, peanuts, treenuts and cotton. Hence, it is a well characterized and established model for investigating molecular mechanisms underlying fungal secondary metabolite syntheses for fungal pathogens in general that are connected significant economic and health implications.

As described further herein, disclosed methods can impact aflatoxin production in *A. parasiticus* by addition of Ag NPs to the growth medium. Specific examples herein utilize 20 nm sized citrate-coated silver nanoparticles (cit-Ag NPs), but Ag NP are not limited to any particular size or any particular coating. For example, the nanoparticles can be about 50 nm or less in average size in some embodiments, for instance from about 10 nm to about 40 nm in some embodiments. In general, nanoparticle sizes include the presence of any coating material on the surface of the core silver nanoparticle.

Cit-Ag NPs have been routinely used as a model for manufactured nanoparticles in several previous studies that have examined the uptake and toxicity of Ag NPs in microbes, aquatic animals and other eukaryotic cells. More specifically described in the Examples section below is the effect of a working cit-Ag NP concentration (about 50 nM) on mycelial growth and aflatoxin biosynthesis at the levels of transcription activation of the aflatoxin gene cluster and the investigation of the possible mechanism for inhibition of aflatoxin biosynthesis.

Disclosed methods include contact of a targeted fungus with a composition including silver nanoparticles. In one embodiment, the silver nanoparticles can be coated with a suitable material, such as a citrate coating as discussed further in the examples section, below, which can prevent aggregation of the nanoparticles in the composition. Coating of the nanoparticles is not required, however. Other suitable coating materials can include polymeric coatings, including hydrophilic polymer coatings such as polyvinyl pyrrolidone (PVP) and the like.

The concentration of the silver nanoparticles in a composition can be much lower than concentrations examined in the past in typical toxicological and ecotoxicological studies. While the silver nanoparticle concentration can vary depending upon specific characteristics of a protocol including, without limitation, the environmental compartment of concern, the local conditions, expected weather events such as tidal flooding, etc., in general a composition can include silver nanoparticles at a concentration of about 50 nM or less. For example, a composition can include silver nanoparticles at a concentration of from about 10 picograms per liter to about 1 microgram per liter in water-based applications and from about 4 micrograms per kilogram to about 14 micrograms per kilogram in dry compositions (e.g., for soil-based applications). In general a dry composition is one that includes moisture at no more than the ambient humidity level and includes a mixture of particulates.

The present disclosure may be better understood with reference to the Examples, set forth below.

Example 1

20 nm Ag NPs are shown to cause a greater than 2 fold inhibition of biosynthesis of the carcinogenic mycotoxin and secondary metabolite, aflatoxin B1 in the filamentous fungus and an important plant pathogen, *Aspergillus parasiticus*, without inhibiting fungal growth. Inhibition by the Ag NPs was distinguished from use of Ag ions and occurred upon mycelial uptake of Ag NPs at the level of transcript accumulation of aflatoxin genes and at least two key global regulators of secondary metabolism, laeA and veA, with a concomitant reduction of total reactive oxygen species (ROS). Upon depletion of Ag NPs in the growth medium, total mycelial ROS increased to levels equivalent to untreated cells and the fungus was able to regain completely its ability to synthesize aflatoxin. These results demonstrate the ability of the Ag NPs to inhibit fungal secondary metabolism at sub-lethal concentrations, hence providing a novel start point for discovery of custom designed engineered nanoparticles that can efficiently prevent mycotoxins with minimal risk to health and environment.

Nanoparticle Synthesis

Cit-Ag NPs were synthesized by a standard chemical reduction methods. Briefly, 100 mL aqueous solution of silver nitrate (0.25 mM), 100 mL aqueous solution of sodium citrate (0.31 mM) and 10 mL of 0.25 mM of sodium borohydride was prepared and stored at 4° C. in absence of light for 30 min. The silver nitrate and sodium citrate solutions were mixed together in a conical flask and stirred vigorously. Subsequently, 6 mL of the sodium borohydride was added to this reaction mix as the reducing agent. After 10 min of stirring, the reaction mix was heated slowly to boiling. The solution was then heated for an extra 90 min, left overnight and cooled (4° C., in the dark). The Ag NPs thus formed (as indicated by the change of solution color from colorless to yellow) were then cleaned, to remove the excess reagents, by ultrafiltration (Amicon, 1 kDa regenerated cellulose membrane, Millipore) in a diafiltration mode to prevent NP aggregation and drying. Ag NPs were re-dispersed in 0.31 mM sodium citrate solution to avoid further growth and the washing process was repeated at least three times and was performed each time before use. The concentration of Ag NPs was measured by inductively coupled plasma-optical emission spectroscopy and was about 9.6±0.1 mg $L^{-1}$.

Nanoparticle Characterization

Presence of Ag NP suspension was determined in the NP suspension using surface plasmon UV-Vis spectrophotometry (wavelength 200 nm to 800 nm). The average hydrodynamic diameter and polydispersity index (PDI) were determined using dynamic light scattering (DLS) using a Malvern Zetasizer (Nanoseries, Malvern Instruments) as described previously. The z average diameter and PDI were measured five times to calculate the standard error of mean. Particle size distribution, and shape were analyzed using transmission electron microscopy (TEM). Briefly, NPs were drop deposited onto Formvar/carbon coated 50 mesh Cu grids (S162-3, AGAR Scientific) and allowed to adsorb to the carbon coating for 10 min (without drying). The grids were then gently immersed in ultra-pure water to remove un-adsorbed particles, and air-dried under protective cover. Electron micrographs (10 micrographs from various locations of the grids) were acquired using TEM (Hitachi H-8000) at 200 keV. Cit-Ag NP aggregation in the test media was qualitatively monitored by UV-vis. Finally the concentration of the synthesized Ag NPs was measured by inductively coupled plasma-atomic emission spectroscopy (ICP-OES).

Determination of Total and Dissolved Silver Concentrations

Mycelia after NP exposure (50 mg) and fungal growth media (1 mL) samples were digested at room temperature (with 10 mL of 70% nitric acid (AR grade; Fisher scientific) for 24 h. This reaction mixture was diluted with 15 mL double distilled water and heated at 80° C. for 15 min prior to cooling to room temperature and filtration (Whatman filter paper 2). The samples were finally diluted in 100 mL volumetric flask and then analyzed using an inductively coupled plasma-optical emission spectrometer (ICP-OES; Varian 710-ES). The detection limit was 5 μg $L^{-1}$. Dissolved silver in the growth media was determined by centrifugation (4000×g, 45 min) and ultrafiltration (Amicon; 1 Kda cutoff) of the media and subsequent ICP-OES analyses of the filtrate. Nanoparticle concentration was determined by difference.

Fungal Strain, Medium and Growth Conditions

The wild-type aflatoxin producer, *Aspergillus parasiticus*, SU-1 (NRRL 5862) was used for this study. For NP exposure experiments, 106 spores of *A. parasiticus* were inoculated in 100 mL yeast extract sucrose (YES) liquid growth medium containing cit-Ag NP (50 ng $mL^{-1}$), and grown under standard growth conditions (in an incubator shaker at 29° C. in absence of light, with rpm 150). The choice of 50 ng/mL as the ideal working concentration for this study was based on an initial dose-response experiment (see results), which was used to determine the cit-Ag NP concentration that only inhibited aflatoxin biosynthesis without affecting fungal growth. Untreated control groups were grown under same growth conditions but in absence of cit-Ag NPs.

Growth and Aflatoxin Measurements

Quantitative comparisons of growth were conducted using dry weight measurements of harvested mycelia. Aflatoxin B1 accumulation in the growth medium was quantified using Enzyme-Linked Immunosorbant Assay (ELISA). Since previous studies that have employed the fungal growth conditions used here have shown that 40 hour cultures demonstrate aflatoxin biosynthesis and export into the growth medium at peak levels, a comparison of 40 h aflatoxin levels in the presence and absence of cit-Ag NPs was conducted. Aflatoxin levels were measured at 48 h time-point as well to examine whether aflatoxin biosynthesis could revert to control levels after an almost complete removal (by uptake) of most or all cit-Ag NPs in the growth medium by the mycelium.

NP-Aflatoxin Interaction Assay

Interaction of cit-Ag NPs with aflatoxin was determined by incubating total aflatoxin extracted from a 40 h *A. parasiticus* culture with the NPs at 50 ng $mL^{-1}$ and 100 ng $mL^{-1}$ concentrations for 4 hours. This aflatoxin-cit-Ag NP mixture was ultra-filtered using amicon ultra-centrifugal filter unit (3 Kda). The concentration aflatoxin in the filtrate was compared with an unfiltered mix and an aflatoxin-only control using ELISA. Significance of difference in aflatoxin measurements between the filtrate and the unfiltered mix was used to evaluate NP-aflatoxin interaction and the significance of difference in aflatoxin measurements between the unfiltered mix and the aflatoxin-only control was used to evaluate interference of the NPs in the aflatoxin measurements.

Quantification of ROS

Total ROS generated by mycelia was quantified using a 2',7'-dichlorofluorescein diacetate (DCFH-DA) protocol. For comparison of total ROS generated by mycelia in the presence of absence of cit-Ag NPs, equal weights of mycelia from each sample were placed into 1 mL freshly made 1 μM DCFH-DA in PBS. The yield of the fluorescent product dichlorofluorescin (DCF) upon oxidation of DCFH-DA due to generation of ROS was measured after a 5 hour reaction at 37° C. using an excitation/emission wavelength of 490/525 nm.

Gene Expression Studies

RNA extraction, purification and cDNA synthesis: Total RNA was extracted from cells harvested in triplicates using a TRIzol (TRIzol Reagent; Invitrogen, Carlsbad, CA) based method. Within 24 hours of extraction, RNA cleanup was conducted using a Qiagen® RNEasy Cleanup Kit (Qiagen, Valencia, CA), and then stored at −80° C. The cDNA was synthesized from RNA using a reverse transcription kit (New England BioLabs Inc., Ipswich, MA) according to manufacturer's instructions.

Real-time PCR assays: The expressions of aflatoxin and superoxide dismutase (SOD) genes were measured using quantitative real-time PCR assays using SsoAdvanced universal SYBR Green supermix (BioRad Laboratories, Hercules, CA) and gene specific forward and reverse primers (Table 1). The gene specific primers were designed using Primer3 online software (http://www.ncbi.nlm.nih.gov/tools/primer-blast/). The aflatoxin gene primers were identical to those described previously[43]. Reactions were performed in a CFX96 thermal cycler (Bio-Rad Laboratories, Hercules, CA). Similar to the previous gene expression studies in *A. parasiticus*[43], β-tubulin gene was used as the housekeeping gene. Expression value of each gene was obtained from the threshold cycle values that were normalized against 18SrRNA expression in each sample. All RT-PCRs were performed in triplicates for each gene per sample. Data analysis of gene expression studies were performed using CFX Manager software (Bio-Rad Laboratories).

TABLE 1

| Gene | Primer Sequence |
|---|---|
| afIR | F 5'-ACCTCATGCTCATACCGAGG-3' (SEQ ID NO: 1)<br>R 5'-GAAGACAGGGTGCTTTGCTC-3' (SEQ ID NO: 2) |
| Nor-1 | F 5'-CACTTAGCCAGCACGATCAA-3' (SEQ ID NO: 3)<br>R 5'-ATGATCATCCGACTGCCTTC-3' (SEQ ID NO: 4) |
| Ver-1 | F 5'-AACACTCGTGGCCAGTTCTT-3' (SEQ ID NO: 5)<br>R 5'-ATATACTCCCGCGACACAGC-3' (SEQ ID NO: 6) |
| omtA | F 5'-CGAAGCCACTGGTAGAGGAG-3' (SEQ ID NO: 7)<br>R 5'-ACGAATGTCATGCTCCATCA-3' (SEQ ID NO: 8) |
| Vbs | F 5'-TGGATAGGGCTCTCGCTAAA-3' (SEQ ID NO: 9)<br>R 5'-CTCCTGTTGCACGATTCTGA-3' (SEQ ID NO: 10) |
| β-tubulin | F 5'-TCTCCAAGATCCGTGAGGAG-3' (SEQ ID NO: 11)<br>R 5'-TTCAGGTCACCGTAAGAGGG-3' (SEQ ID NO: 12) |
| VeA | F 5'-TCCAGCTATCCCAAGAATGG-3' (SEQ ID NO: 13)<br>R 5'-TAATCCCCCGATAGAGCCTT-3' (SEQ ID NO: 14) |
| LaeA | F 5'-ATGGGGTGTGGAAGTGTGAT-3' (SEQ ID NO: 15)<br>R 5'-ATCGGTAAAACCAGCCTCCT-3' (SEQ ID NO: 16) |
| FeSOD | F 5'-GAGATGGCCTCCGTATTCAA-3' (SEQ ID NO: 17)<br>R 5'-CATCAATCCTTCCCTCTCCA-3' (SEQ ID NO: 18) |
| MnSOD | F 5'-CCACATCAACCACTCCCTCT-3' (SEQ ID NO: 19)<br>R 5'-TCCTGATCCTTCGTCGAAAC-3' (SEQ ID NO: 20) |
| CuSOD | F 5'-GAGGCCGGAGATATTTCACA-3' (SEQ ID NO: 21)<br>R 5'-CCCTCTTTGCTCTTCGACAC-3' (SEQ ID NO: 22) |

TABLE 1-continued

| Gene | Primer Sequence |
|---|---|
| CuZnSOD Cytosolic | F 5'-CCTCCTTGCAATACAACCGT-3' (SEQ ID NO: 23) R 5'-GTCTTCCTTCGCCTCTTCCT-3' (SEQ ID NO: 24) |
| CuZnSOD1 | F 5'-CACCAGTTCGGTGACAACAC-3' (SEQ ID NO: 25) R 5'-GTGTTCACTACGGCCAAGGT-3' (SEQ ID NO: 26) |

Statistical Analysis

Statistical analyses were conducted using the GraphPad Prism® software (Graphpad, CA, USA). Statistical significance of two-tailed p-values were determined using an unpaired t-test, with n=3 and $p<0.05$.

Properties of Pristine Ag NPs

Figure 2:
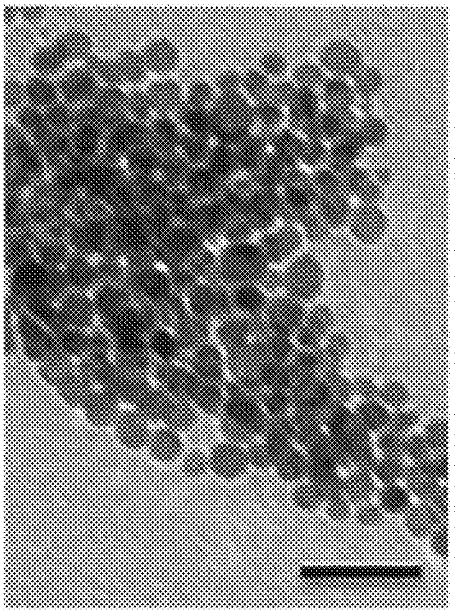
FIG. 2 is a transmission electron microscopy (TEM) image of a representative cit-Ag NP sample.
Figure 3:
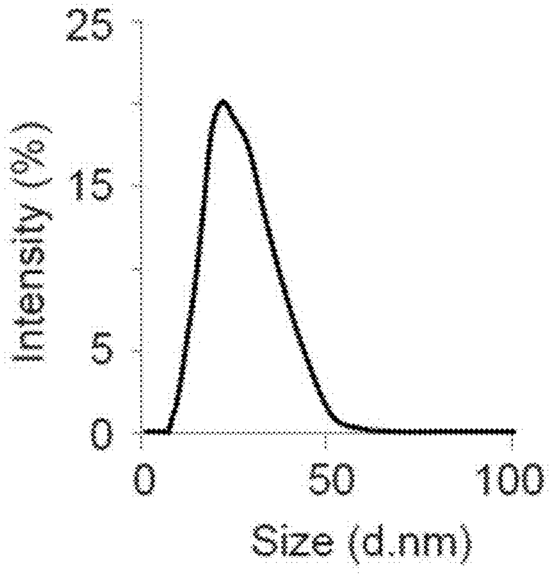
FIG. 3 provides dynamic light spectroscopy of a representative cit-Ag NP sample.

The absorption spectrum of cit-Ag NPs (FIG. 1) showed a single peak centered on $\Delta_{max}$ 395 nm (implicative of successful synthesis of the 20 nm Cit-Ag NPs) and showed no signs of Ag NP aggregates in the synthesized suspension. TEM micrographs confirmed that Cit-Ag NPs were present predominantly as single particles (representative TEM image shown in FIG. 2). The average core size of the NPs as revealed by TEM was ca. 13.8+/−2.3 nm (mean+/− standard deviation, n=500). The average hydrodynamic diameter and size PDI as revealed by DLS were ca. 20.1±1.0 nm (FIG. 3) and 0.11±0.03 respectively, implicating a narrow size distribution. The total concentration of the Ag NP stock solution was 9.6 mg $L^{-1}$.

Choice of Cit-At NP Dose for Studying Effect on Aflatoxin Biosynthesis

Figure 4:
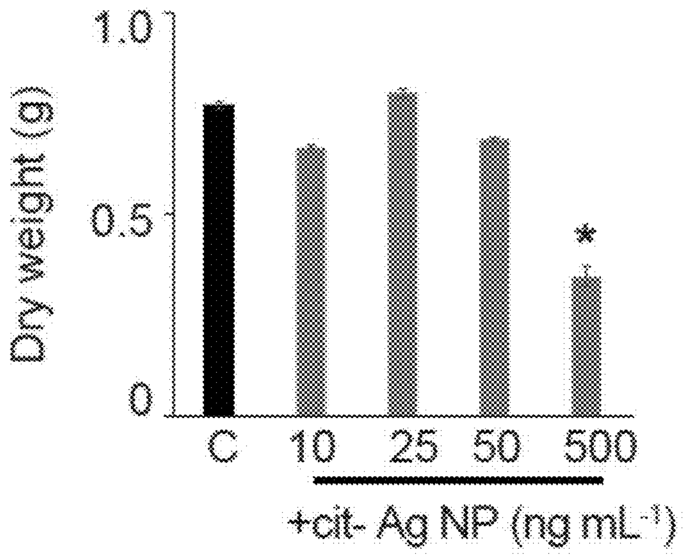
FIG. 4 graphically presents the effect of different doses of cit-Ag NP exposure on *A. parasiticus* growth. Statistical significance of two-tailed p-values were determined using an unpaired t-test, with n=3 and $p<0.05$ as significance level.

A dose-response experiment in which the effect in growth upon exposure to each tested dose was compared with an untreated set of samples demonstrated that cit-Ag NP did not inhibit *A. parasiticus* growth within 10-50 ng $mL^{-1}$ concentration range (FIG. 4). However, higher concentrations up to 500 ng $mL^{-1}$ (highest concentration measured), resulted in significant growth inhibition (~2 fold reduction of dry-weight). Also concentrations of less than about 50 ng $mL^{-1}$ did not result in significant reduction in aflatoxin levels in the growth medium.

Figure 5:
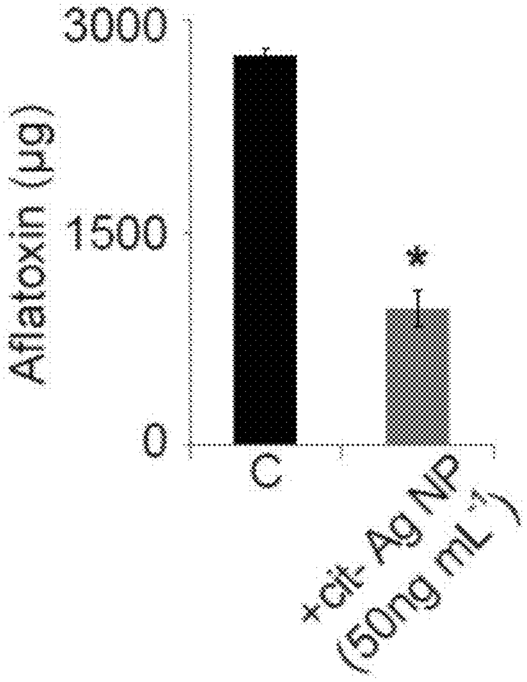
FIG. 5 graphically presents the effect of cit-Ag NP exposure on aflatoxin biosynthesis by *A. parasiticus*. Statistical significance of two-tailed p-values were determined using an unpaired t-test, with n=3 and $p<0.05$ as significance level. '*' denote significance.

A dose of 50 ng mL-1 cit-Ag NP was spiked into the growth medium during the start of growth. Aflatoxin B1 accumulation in the growth medium upon cit-Ag NP exposure was compared with untreated samples at 40 h. As shown in FIG. 5, at 50 ng $mL^{-1}$, cit-Ag NP resulted in significant reduction (~2 fold) of aflatoxin accumulation in the growth medium. Aflatoxin measurement and growth analyses were conducted with 40 h cultures based on previous studies, which show that under our growth conditions aflatoxin is synthesized at peak levels at 40 h.

To confirm that reduction of aflatoxin accumulation in the growth medium was not due to growth effects at time points earlier than 40 h time-point, the growth rates of the fungus (cit-Ag NP treated versus untreated) were compared during the 40 h period. Specifically, a dose of 50 ng $mL^{-1}$ cit-Ag NP was spiked into the growth medium during the start of growth. Dry weights were monitored during a time span of 40 h to derive the growth rates (ng $h^{-1}$) by quantifying the slope of the growth curves during the exponential growth phase. The growth rates were compared with the untreated samples.

Figure 6:
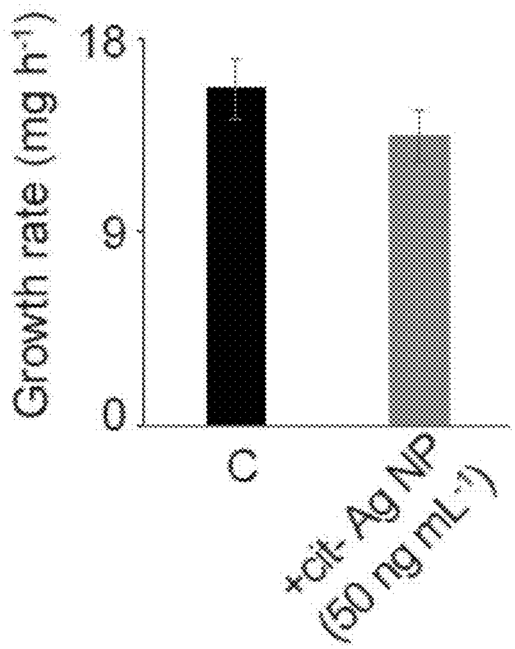
FIG. 6 graphically presents the effect of cit-Ag NP exposure on *A. parasiticus* growth rates. Statistical significance of two-tailed p-values were determined using an unpaired t-test, with n=3 and $p<0.05$ as significance level. '*' denote significance.

No significant difference in growth rate, expressed as dry weight accumulation per unit time (mg $h^{-1}$), was observed between the cit-Ag NP treated mycelia and untreated mycelia (FIG. 6), suggesting that at the applied concentration, cit-Ag NP associated inhibition of aflatoxin accumulation in the growth medium was not a fungal growth inhibition effect.

Figure 14:
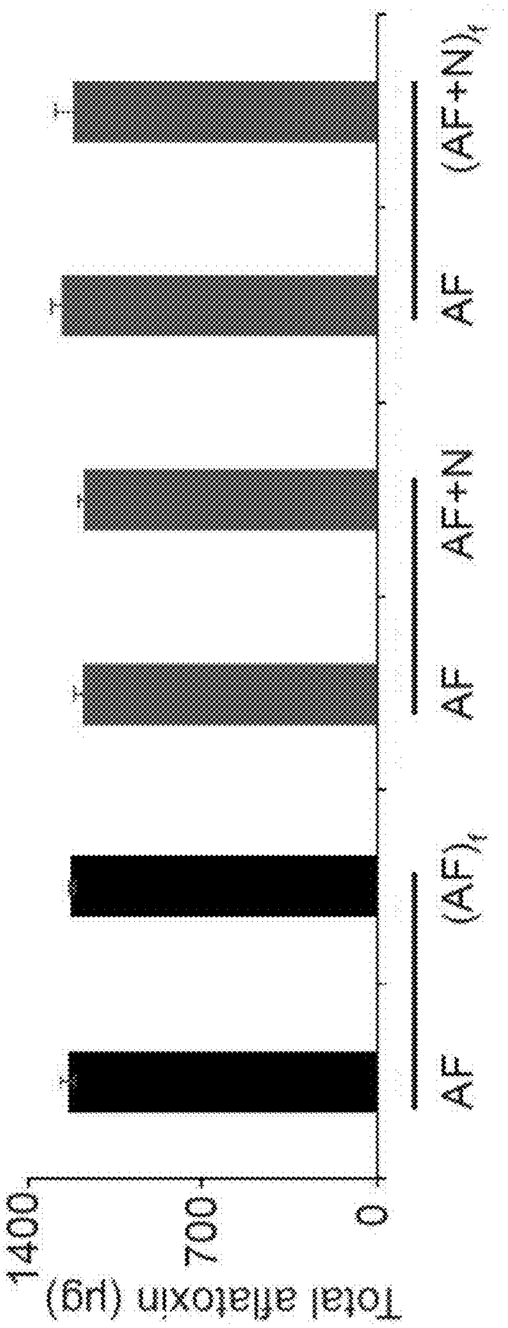
FIG. 14 provides results of an aflatoxin-NP interaction assay.

Also, NP-aflatoxin interaction assays were carried out in which equal volumes of aflatoxin B1 from a stock solution were incubated with NPs for 4 h. Results are shown in FIG. 14. One triplicate set, $(AF+N)_f$, was ultrafiltered and ultracentrifuged and aflatoxin was quantified in the filtrate. In another set, AF+N, aflatoxin was incubated with NP for 4 h as well and aflatoxin was quantified in that mix without ultrafiltration and ultracentrifugation. Finally, in a control set, $(AF)_f$, aflatoxin was just ultrafiltered and ultracentrifuged without exposure to NP and quantified in the filtrate. The aflatoxin quantities in the three sets were compared with the aflatoxin measurements in the triplicate set of equal volumes of the aflatoxin stock (AF) and results indicated no significant differences in aflatoxin measurements between aflatoxin-NP mixtures, ultra-filtered aflatoxin-NP mixtures and aflatoxin-only controls, indicating that the reduced aflatoxin measurements were not an artifact from aflatoxin-NP interactions). Hence the cit-Ag NP concentration of 50 ng $mL^{-1}$ was chosen as an ideal dose to examine the possibility of specific inhibitory effects of the NPs on aflatoxin synthesis.

Interaction of Cit-Ag NP with the Growth Medium

Figure 15:
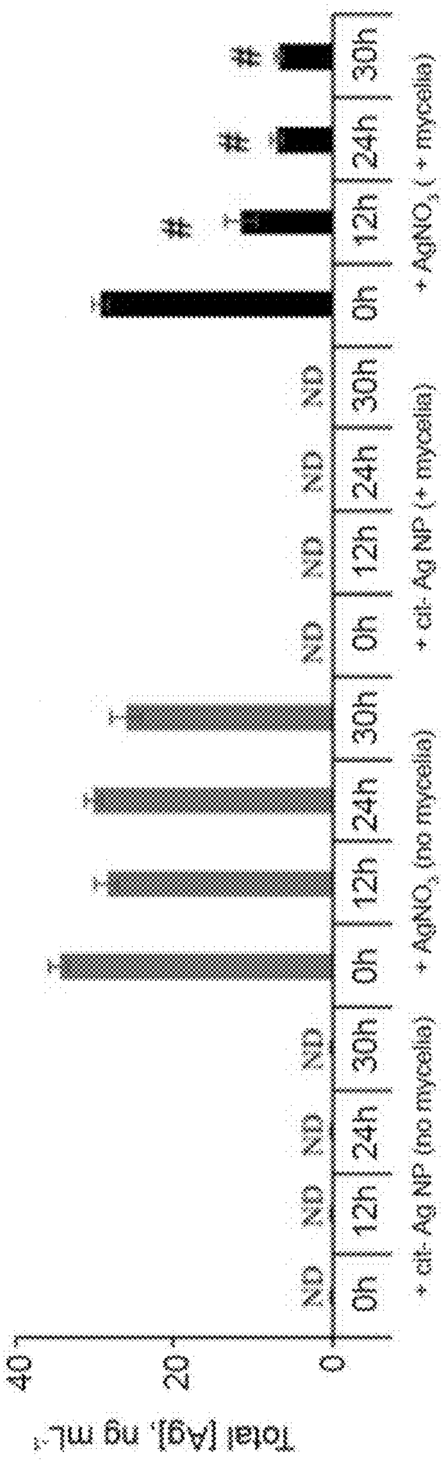
FIG. 15 presents the quantification of total dissolved silver in growth medium spiked with either cit-Ag NP or silver nitrate.

The possibility of whether the observed cit-Ag NP-mediated reduction in aflatoxin accumulation in the growth medium was caused by dissolution of the NPs into the growth medium was also explored. ICP-OES analysis of the filtrate upon ultracentrifugation and ultrafiltration of the growth medium harvested at 0 h, 12 h, 24 h and 30 h from the start fungal growth were conducted. Results are shown in FIG. 15 (N.D.—below detectable limit). As shown, residual silver in the growth medium was found to be below the ICP-OES detection limit (5 ng $mL^{-1}$, i.e. <10% total NP load) at all the observed time-points of fungal growth, thereby suggesting an absence of detectable dissolved Ag ions in the growth medium.

On the contrary, control growth medium with silver ions spiked into the growth medium by addition of silver nitrate (50 ng $mL^{-1}$) displayed detectable residual silver (after ultracentrifugation and ultrafiltration) until 30 h (FIG. 15). The progressive decrease of detectable silver in this control experiment could be due to multiple factors such as uptake of silver ions by fungi, possible precipitation, non-sampling or formation of larger silver complexes with the nitrogenous compounds in the YES growth medium that could not be measured in the process. Clearly the results demonstrate that cit-Ag NP interaction with the growth medium was qualitatively different from that demonstrated by silver ions.

Formation of a protein corona by particle-protein interactions, nanoparticle aggregation and colloidal stabilization are common phenomena for charge stabilized Ag NPs such as cit-Ag NP in biological medium. Hence, it is possible that the Ag NPs undergo dissolution and reprecipitation that are different from ions alone. The NPs could also form large complexes formed in-situ with the proteins and other nitrogenous compounds of the growth medium. It is also possible that the nascent silver complexes coat the residual cit-Ag NP and prevent their dissolution into the growth medium.

It has been shown previously that particle interactions in biological media and their aggregation due to charge screening from the inorganic components in the media impact the surface plasmon resonance (SPR) of nanoparticles resulting in a spectral red-shift and progressive broadening of their absorbance peak, along with the formation of a new peak. Hence a time-course comparison of SPR of the NP containing YES growth medium with the growing fungus (N+M+F) was compared with that of the controls: NP containing YES growth medium (N+M) and the pristine nanoparticle suspension (N). To carry out the comparison, spectral profiles of growth medium spiked with 50 ng/mL cit-Ag NP (N+M) and growth medium spiked with cit-Ag NP containing the growing mycelia (N+M+F) were compared with the 50 ng/mL cit-Ag NP stock solution (N) to conduct the qualitative analysis of the cit-Ag NP absorbance peaks under each condition.

Figure 7:
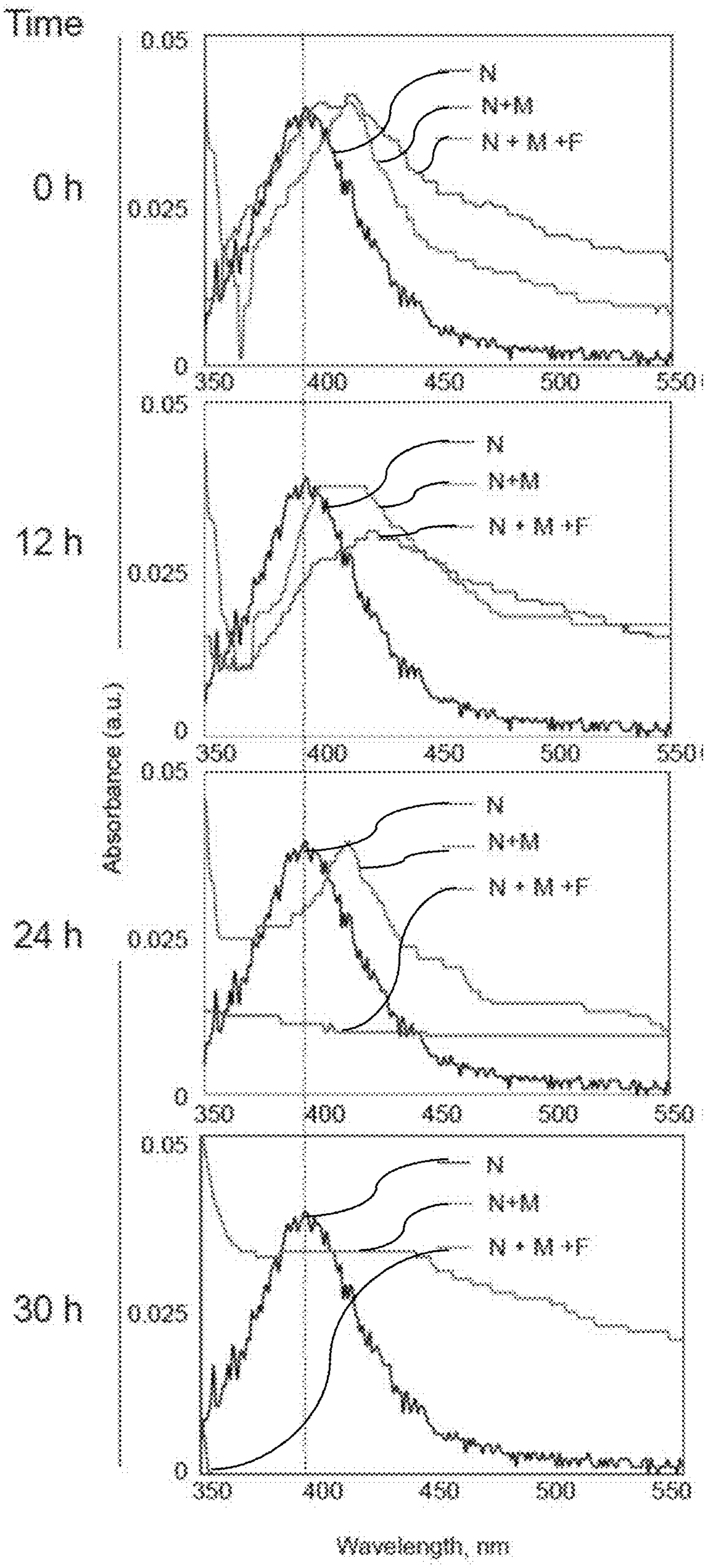
FIG. 7 presents time-course UV-Vis spectral profiles of growth medium showing NP behavior and uptake during fungal growth in the presence of cit-AG NP.

As shown in FIG. 7, by 12 h, the SPR of both N+M and N+M+F resulted in a spectral red-shift with progressive broadening of their absorbance peak as compared with that of the pristine cit-Ag NP (N) that showed absorbance peak at 394-395 nm. The broadening of the peak was more prominent in N+M+F than N+M. At 12 h, a significant absorbance reduction at $\lambda_{max}$ was observed in N+M+F. At 24 h, N+M showed primary peak at 413-414 nm that broadened further by 30 h. In N+M+F however, the primary peak was lost completely by 30 h.

The shifting of the SPR peaks to higher wavelength in N+M and N+M+F could be attributed to the chloride ions (from NaCl present in the YES growth medium) resulting in the formation of AgCl nanoparticles and/or the formation of AgCl coating on the surface of cit-Ag NPs. It could also be attributed to the aggregation of cit-Ag NPs due to specific chemical interactions with glutamic acid, calcium chloride, magnesium sulfate, and sodium bisulfite. These are all present in YES and are efficient in neutralizing the surface charge of cit-Ag NP inducing cit-Ag NP-aggregation. Shift of SPR peaks could also be due to the replacement of surface coating by organic molecules and interaction with other media components. The progressive reduction of peak height and finally a loss of NP signals could be caused by multiple factors that exist for both N+M+F and N+M, such as dissolution of cit-Ag NP, aggregation of particles and formation of small silver chloride particles that do not have associated SPR absorbance. However, since this was observed only in N+M+F, it is believed that interactions of the NPs with the growth medium were different between N+M and N+M+F. It is likely that amino acids or proteins secreted by the mycelia can get bound or adsorbed on the surface of cit-Ag NPs and can form a corona, which could result in the differential SPR absorbance.

Mycelial Uptake of Silver

Figure 8:
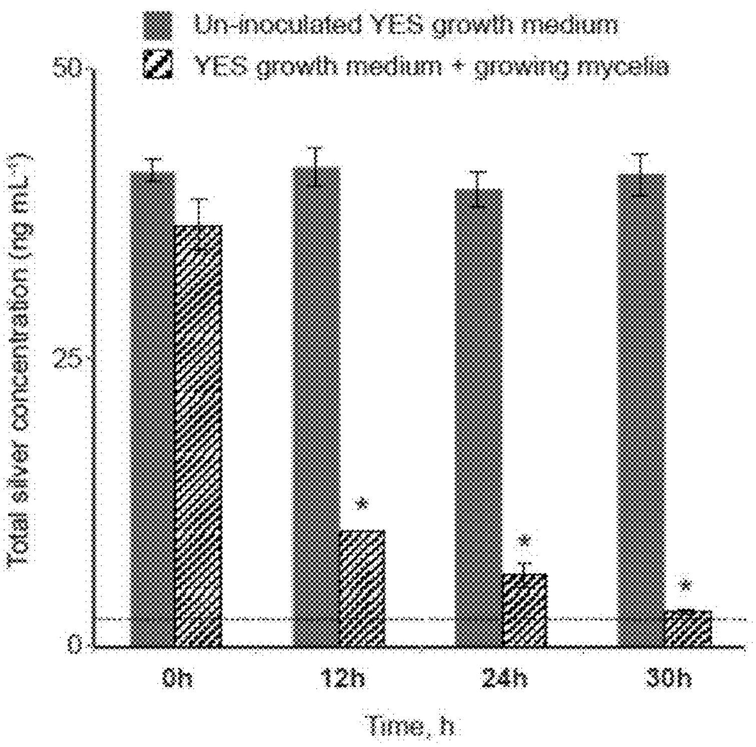
FIG. 8 graphically illustrates the reduction of total silver in a growth medium over a course of fungal growth in growth medium spiked with cit-Ag NP. Statistical significance of two-tailed p-values were determined using an unpaired t-test, with n=3 and $p<0.05$ as significance level. '*' denote significance.

A dose of 50 ng $mL^{-1}$ cit-Ag NP was spiked into the growth medium during the start of growth. A time-course ICP-OES analysis was performed until minimum detection limit (3 ng $mL^{-1}$) was reached at 30 h. Results are shown in FIG. 8—minimum detection limit is indicated by the dashed line. These results are compared in the figure with total silver levels at the corresponding time-points in the 'growth medium only' control flasks. The ICP-OES measurements indicated that total [Ag] in the growth medium decreased by approximately 85% within 24 h. In contrast, the total [Ag] remained unchanged in the un-inoculated (control) growth medium (N+M).

Figure 16:
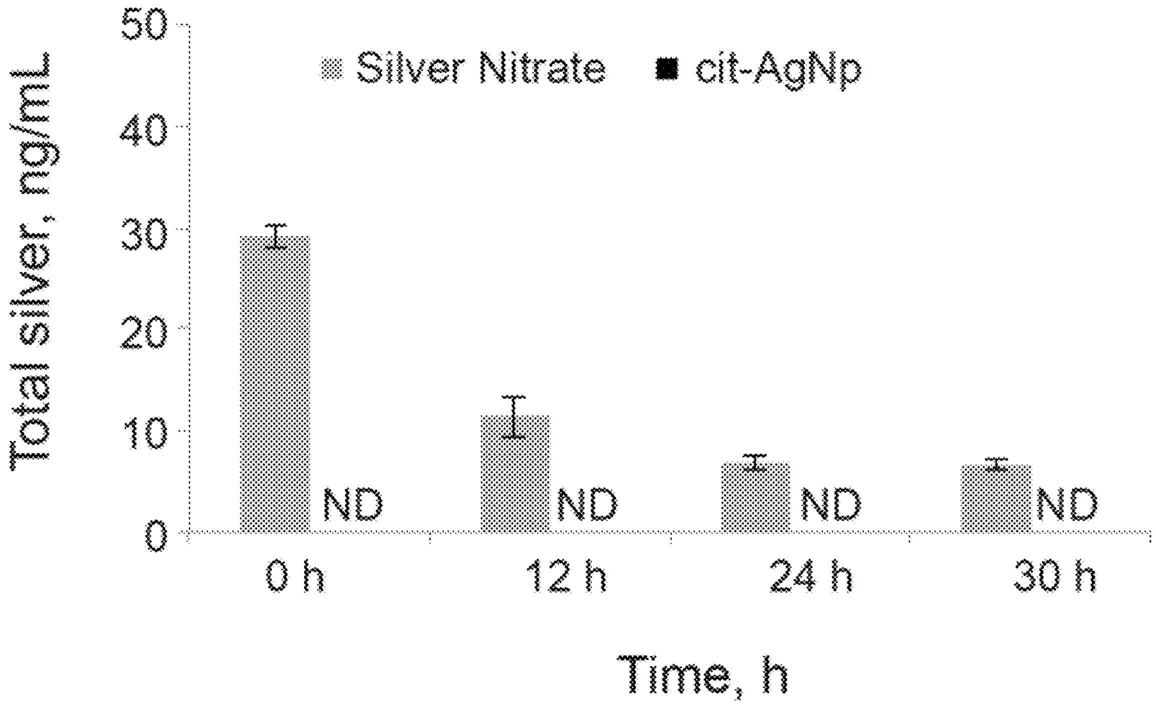
FIG. 16 graphically illustrates the reduction of total silver in a growth medium over a course of fungal growth for growth medium spiked with cit-Ag NP following ultrafiltration and ultracentrifugation compared with growth medium spiked with silver nitrate ($AgNO_3$) at 50 ng/mL.

To estimate the contribution of dissolved ion in the total [Ag] measurements, the ICP-OES measurements were done on the growth media obtained from the same time points but after ultrafiltration and ultracentrifugation. As indicated in FIG. 16 total [Ag] was below ICP-OES detection limit in all these samples; however in presence of $AgNO_3$ (50 ng $mL^{-1}$) instead of cit-Ag NP in the growth medium, ultrafiltered and ultracentrifuged growth medium showed detectable presence of [Ag] both in presence and absence of mycelia.

These measurements suggested that the contribution of Ag ion in the total [Ag] measurements in FIG. 8 was minimal. Additionally, unlike cit-Ag NP, which reduced aflatoxin accumulation in the growth medium, Ag ions increased aflatoxin accumulation in the medium.

Figure 9:
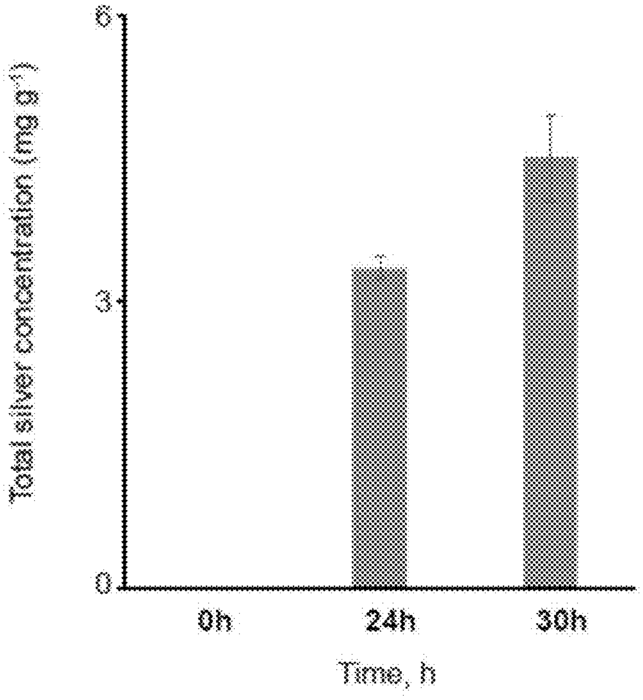
FIG. 9 graphically illustrates the increase in total silver in mycelia over a course of fungal growth in growth medium spiked with cit-Ag NP.

ICP-OES was also performed with spores (0 h) and mycelia (at 24 h and 30 h). Consistent with the decrease of total [Ag] in the growth medium, total [Ag] in the mycelia increased during the period of 30 h within which, about 80% of the total increase in mycelial silver occurred by the first 24 h of growth (FIG. 9). No detectable silver was found in untreated mycelia (data not shown). Total [Ag] was below detection limit of ICP-OES (5 ng $mL^{-1}$) in the control mycelial samples grown in absence of cit-Ag NP (data not shown). Overall, these data confirm the uptake of silver by the mycelia during the 0-30 hour time-period that correlated well with the reduction in total [Ag] observed in YES growth and the change of NPs as determined by the absorbance peak observed in FIG. 4. Overall these results demonstrate that compared to Ag ions, the NPs behave differently in the growth medium, taken up more readily than Ag ions, which indicate a possible route by which NPs resulting in opposite effects on aflatoxin accumulation compared to the ions.

Effect of Cit-Ag NP on Transcript Accumulation of Aflatoxin Regulatory Genes

Expression of five representative genes, nor-1, vbs, ver-1, omtA and the aflatoxin pathway regulator aflR of the aflatoxin biosynthesis gene cluster was examined. mRNA levels at 24 h for the aflatoxin pathway genes and the global secondary metabolism regulators (laeA and veA) upon cit-Ag NP uptake were compared with the untreated controls.

Figure 10:
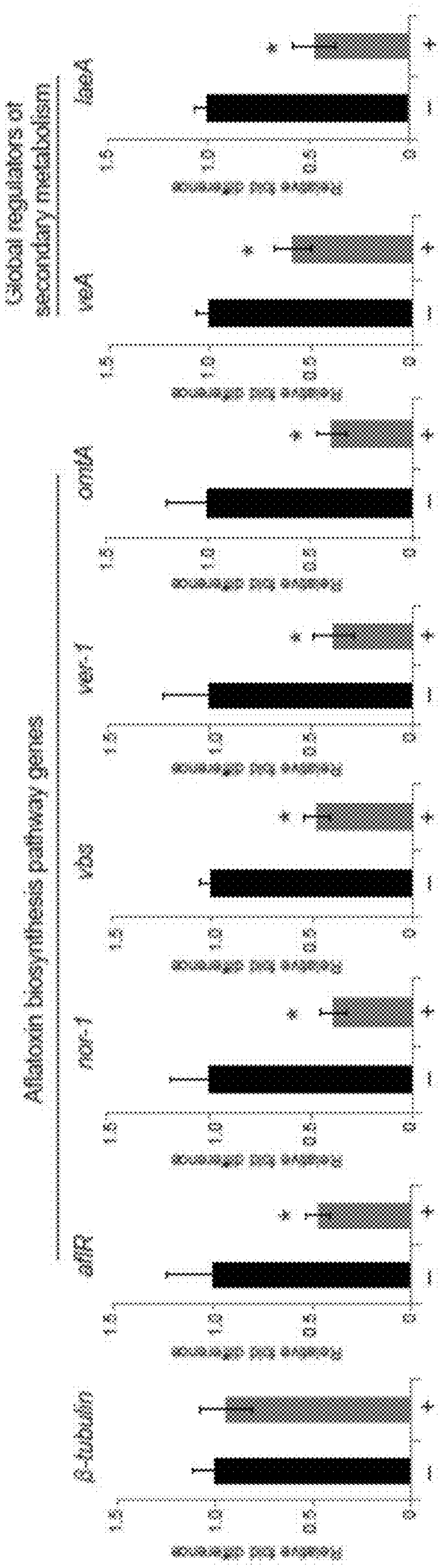
FIG. 10 presents the effect of cit-Ag NP on aflatoxin biosynthesis regulatory gene transcripts showing mRNA levels at 24 h for several aflatoxin pathway genes and the global secondary metabolism regulators. Statistical significance of two-tailed p-values were determined using an unpaired t-test, with n=3 and $p<0.05$ as significance level. '+', mycelia treated with cit-Ag NP, '−', untreated samples, '*' denote significance.

Results (FIG. 10) revealed that with the presence of cit-Ag NP in the growth medium the transcripts of all five genes demonstrated at least a ~2 fold reduction (FIG. 10) unlike the housekeeping gene β-tubulin, which showed no significant effect in transcriptional activation upon exposure to cit-Ag NP. These results clearly show that the reduction in aflatoxin accumulation in the growth medium in presence of cit-Ag NP was at least in part caused by the inhibition of aflatoxin biosynthesis at the level of transcriptional inhibition of the aflatoxin gene cluster. To investigate whether this inhibition was orchestrated in part through transcriptional modulation of the global regulators of secondary metabolism, the gene expression of two representative global regulators of secondary metabolism, laeA and veA, were examined. As shown in FIG. 10, mycelia exposed to cit-Ag NP displayed in >2-fold reduction in transcripts of both laeA and veA, thereby demonstrating the ability of cit-Ag NP to inhibit the activation of secondary metabolism in *A. parasiticus*. Results suggest that aflatoxin inhibition by cit-Ag NP was mediated at least in part, by the transcription inhibition of laeA and veA. These genes encode the protein LaeA and VeA both of which are a part of the regulatory complex of secondary metabolism regulatory Velvet complex, which in addition to aflatoxin biosynthetic pathway, regulate other secondary metabolite pathways of filamentous fungi as well. Hence, results demonstrate the feasibility of cit-Ag NPs to inhibit secondary metabolism in filamentous fungi without inhibiting fungal growth. Since reduction in aflatoxin accumulation in the growth medium was observed only upon exposure of the mycelia to cit-Ag NPs and not upon exposure to silver ions, it was reasoned that inhibition of aflatoxin synthesis was associated with cit-Ag NPs and not silver ions in the medium.

Effect of Cit-Ag NP on Total Mycelial ROS

Figure 11:
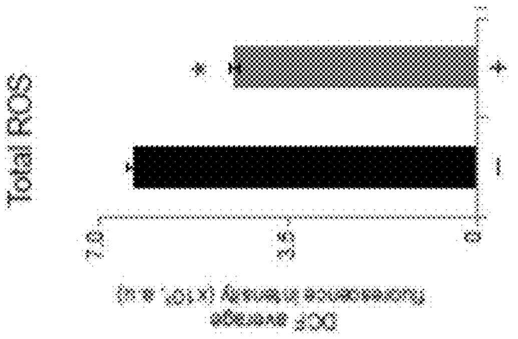
FIG. 11 presents a quantitative comparison of total reactive oxygen species (ROS) at 24 h fungal growth in the presence and absence of cit-Ag NP. Statistical significance of two-tailed p-values were determined using an unpaired t-test, with n=3 and $p<0.05$ as significance level. '+', mycelia treated with cit-Ag NP, '−', untreated samples, '*' denote significance.

Total ROS was quantified using a DCFH-DA based protocol. Quantitative comparison of total ROS generated by cit-Ag NP treated mycelia and the untreated control cells demonstrated that cit-Ag NP exposure resulted in a significant reduction (by ~30%) of total ROS at 24 h (FIG. 11). In addition, cit-Ag NP mediated drop in total ROS was associated with a concomitant reduction of transcriptional activation of the superoxide dismutase genes (SOD genes), which are enzymes that remove superoxides (one class of ROS) through dismutation reactions.

Figure 17:
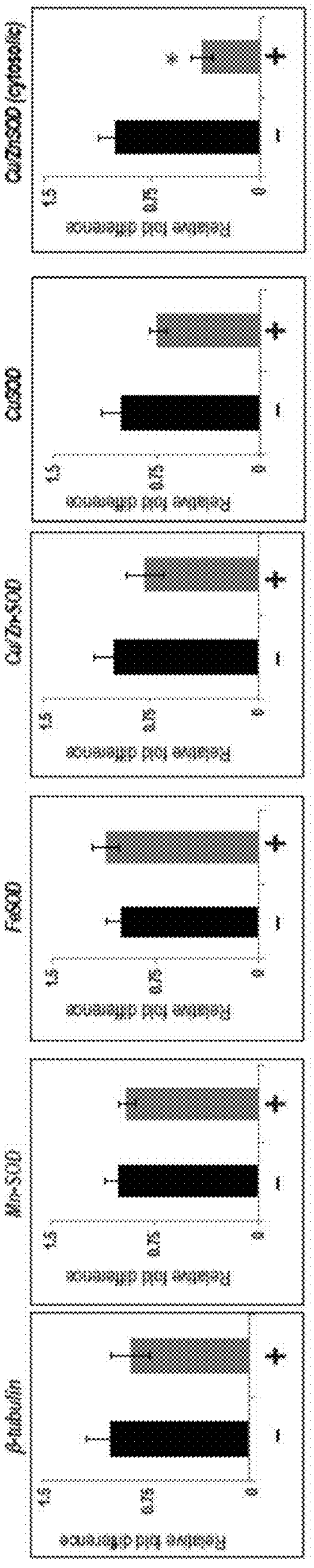
FIG. 17 graphically illustrates the effect of cit-Ag NP on several superoxidase dismutase (SOD) gene transcripts. Statistical significance of two-tailed p-values were determined using an unpaired t-test, with n=3 and $p<0.05$ as significance level. '+' mycelia treated with cit-Ag NP, '−', untreated samples, '*' denote significance.

FIG. 17 illustrates mRNA levels at 24 h for SOD genes upon cit-Ag NP uptake compared with the untreated controls. As shown in FIG. 17, significant reduction was observed in the transcriptional activation of the cytosolic Cu/Zn-SOD gene. No effect was observed on the transcriptional activations of the other SOD genes. Multiple studies suggest that activation of secondary metabolism is a response to an increase in intracellular oxidative stress. These results therefore suggest that cit-Ag NP mediated reduction in intracellular oxidative stress as implicated by the drop in total mycelial ROS and cytosolic Cu/Zn-SOD gene could result in the reduction in transcriptional activation of aflatoxin genes (observed in FIG. 10). Since only the cytosolic Cu/Zn-SOD gene demonstrated transcriptional downregulation, it is possible that cit-Ag NP possibly resulted in the reduction of ROS build-up in the cytosol.

Aflatoxin Biosynthesis Post Cit-Ag NP Removal from the Growth Medium

Figure 12:
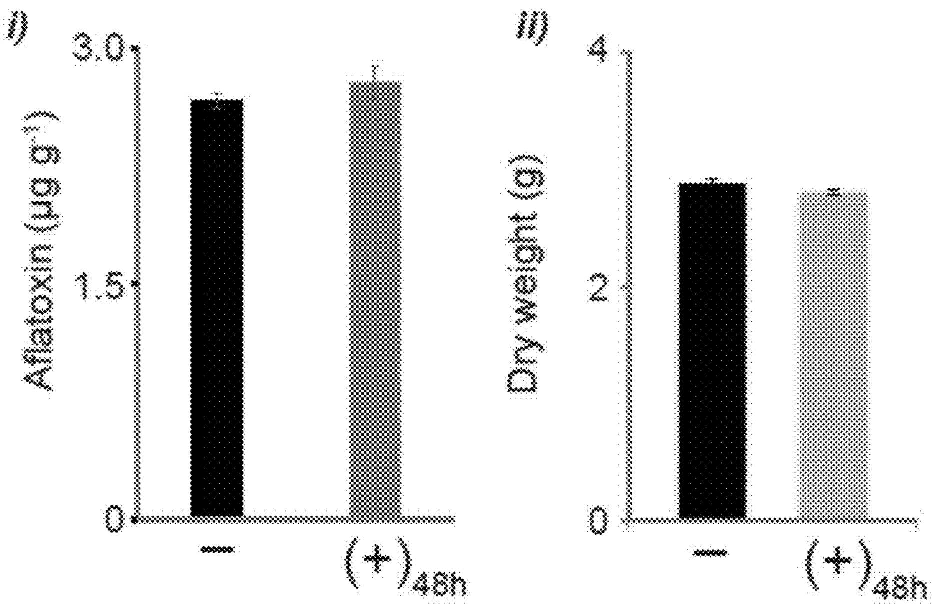
FIG. 12 illustrates at i) aflatoxin B1 accumulation in growth medium at 48 h post cit-Ag NP uptake in treated flasks as compared to untreated samples and at ii) comparison of the dry weights of cit-At NP treated and untreated mycelia. Statistical significance of two-tailed p-values were determined using an unpaired t-test, with n=3 and $p<0.05$ as significance level. '(+)48', 48 h old mycelia grown in presence of cit-Ag NP, '−', untreated samples.
Figure 13:
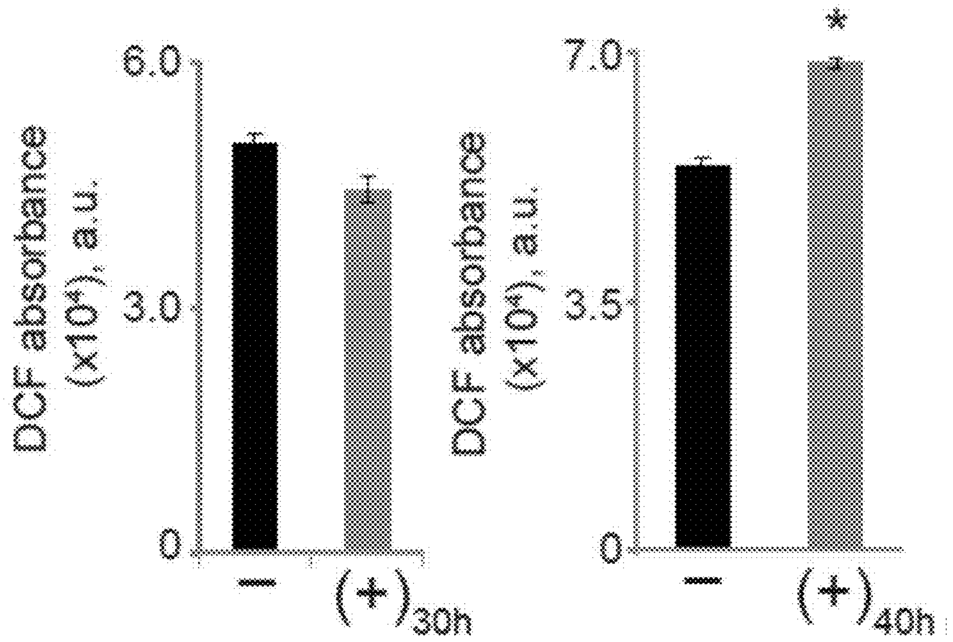
FIG. 13 illustrates a quantitative comparison of total ROS at 30 h (left) and 40 h (right) post cit-Ag NP uptake. '(+)30' and'(+)40', 30 h and 40 h old mycelia grown in presence of cit-Ag NP, '−', untreated samples. Statistical significance of two-tailed p-values were determined using an unpaired t-test, with n=3 and $p<0.05$ as significance level. '*' denotes significance.
Figure 18:
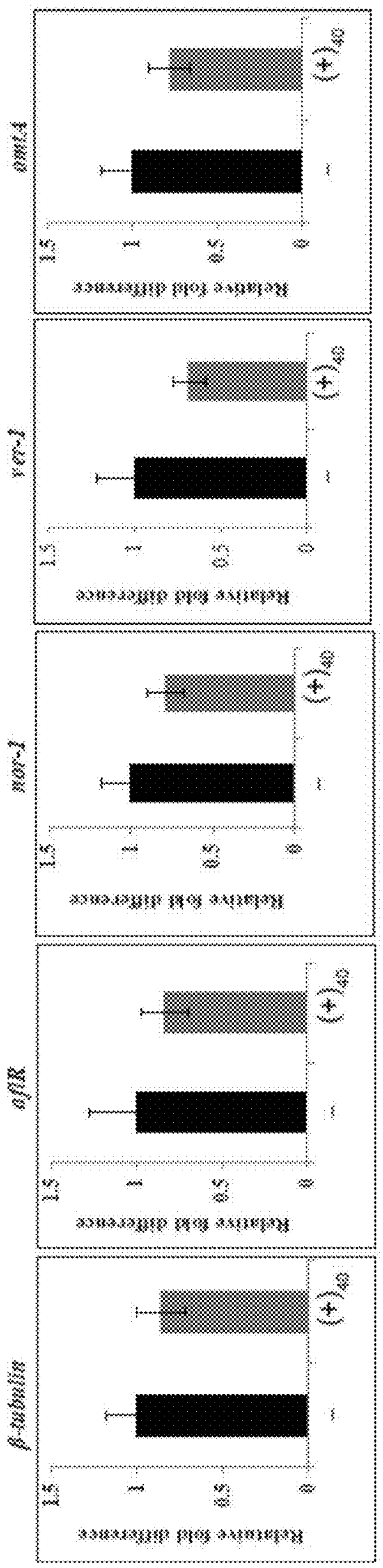
FIG. 18 graphically illustrates mRNA levels at 40 h post cit-AG uptake for several aflatoxin pathway genes compared to untreated controls. Statistical significance of two-tailed p-values were determined using an unpaired t-test, with n=3 and $p<0.05$ as significance level. '(+)40', mycelia treated with cit-Ag NP, '−', untreated samples, '*' denote significance.

To evaluate whether the fungus was able to recover its ability of aflatoxin biosynthesis upon depletion of cit-Ag NPs in the growth medium after 30 h, a quantification of aflatoxin accumulation at 48 h was conducted. As shown in FIG. 12, *A. parasiticus* growth was unaffected at 48 h (i) and aflatoxin accumulation from the treated and control mycelia showed no significant difference (ii), thereby demonstrating that upon depletion of cit-Ag NPs in the growth medium (by ~24-30 h), mycelia were able to regain their full ability of aflatoxin biosynthesis. Analysis of the total ROS at both 30 h and 40 h confirmed the build of ROS in mycelia upon depletion of cit-Ag NP in the growth medium (FIG. 13).

mRNA levels were determined at 40 h for aflatoxin pathway genes (aflR, nor-1, ver-1 and omtA) in the treated mycelia and were compared with the untreated controls. Transcript levels of aflatoxin genes (FIG. 18) also increased to those observed in the control, thereby explaining the ability of the mycelia to regain their ability of aflatoxin biosynthesis.

Overall, these results demonstrate the feasibility of Ag NPs to interfere in the biosynthesis of natural products in filamentous fungi without affecting their growth effect. Mycelial uptake of cit-Ag NP resulted in reduction in intracellular ROS that associated with a down-regulation of the transcriptional activation of secondary metabolism and aflatoxin biosynthesis. This establishes a novel research direction that can generate custom designed engineered nanoparticles that can efficiently control contamination of crops with aflatoxins and other mycotoxins at low concentration ranges that pose minimal human hazard and risk to the environment.

Example 2

Figure 19:
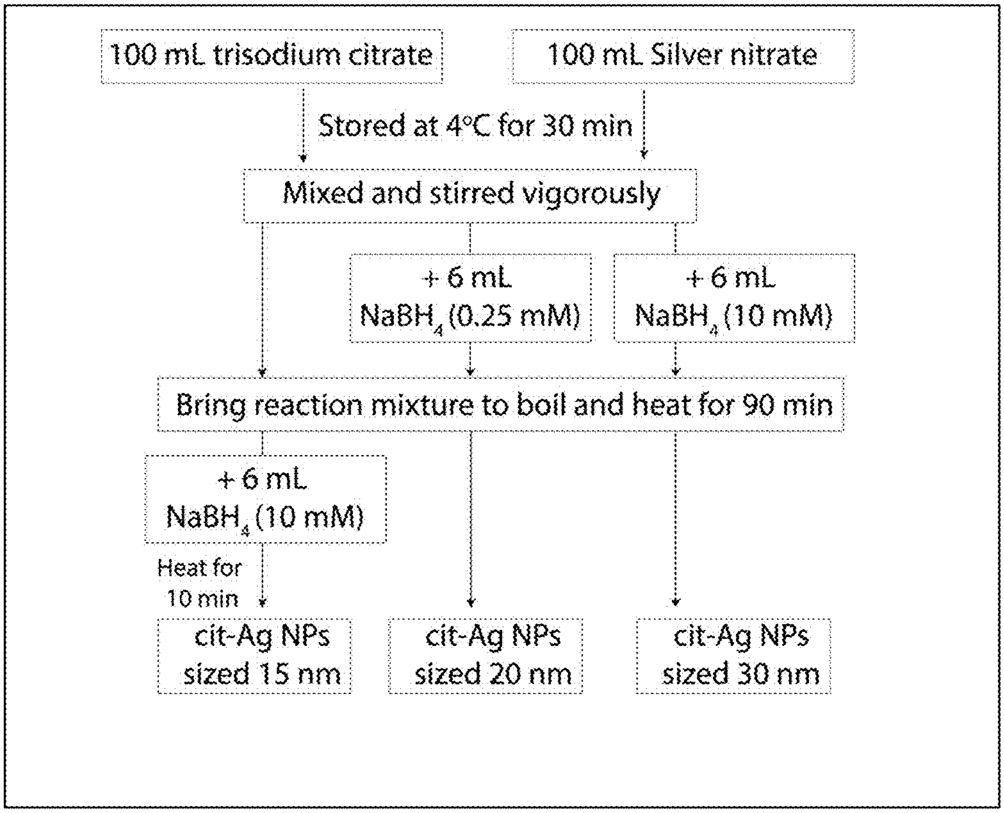
FIG. 19 is a schematic diagram showing synthesis methods for citrate coated silver nanoparticles of different sizes.

Three different sizes of cit-Ag NPs were prepared. As shown in the schematic representation of the overall procedure in FIG. 19, a 100 mL aqueous solution of silver nitrate (0.25 mM) and a 100 mL aqueous solution of sodium citrate (0.31 mM) prepared and stored at 4° C. for 30 min were mixed together in a conical flask and stirred vigorously. This was followed by addition of 6 mL of sodium borohydride ($NaBH_4$) added in three different ways for synthesis of three different sizes of NPs as shown. For synthesis of 20 nm and 30 nm NPs, 0.25 mM and 10 mM $NaBH_4$, respectively, were added to the reaction mixture, followed by heating at boiling temperature for 90 min. For the synthesis of 15 nm NPs, 10 mM $NaBH_4$ was added after heating the mixture for 90 min, followed by heating at the same temperature for 10 min. The reaction mixture was finally stored at room temperature overnight in the absence of light. The AgNPs were cleaned to remove excess amount of dissolved ions from the suspension by ultrafiltration with 1 kDa regenerated cellulose membrane (Millipore) using diafiltrating method, to prevent nanoparticle aggregation and drying. The NP suspensions were finally re-dispersed in 0.31 nM sodium citrate solution to prevent any further growth. This process was repeated three times, following which the NPs were stored at 4° C. (away from light) for future use.

20 nm sized PVP coated Ag NPs (concentration 20 ng $ml^{-1}$) were purchased from Sigma (product #795933).

Nanoparticle Characterization

The presence of Ag NPs in the suspensions was confirmed with surface plasmon UV-Vis spectrophotometry at a wavelength range from 200 nm to 800 nm. All measurements were done in triplicate and were corrected with a blank. Dynamic light scattering (DLS) examination of the suspensions was performed using Malvern Zetasizer (Nanoseries, Malvern Instruments) to estimate the z average diameter and polydispersity index (PDI) of the NPs. The measurements were performed five times to calculate the standard error of the estimated mean diameter. Particle size distribution, and shape were analyzed using transmission electron microscopy (TEM). Briefly, NPs were drop deposited onto Formvar/carbon coated 50 mesh Cu grids (S162-3, AGAR Scientific) and allowed to adsorb to the carbon coating for 10 min (without drying). The grids were then gently immersed in ultrapure water to remove unadsorbed particles and air-dried under protective cover. Electron micrographs (10 micrographs from various locations of the grids) were acquired using TEM (Hitachi H-8000) at 200 keV. The cit-Ag NP aggregation in the test media was qualitatively monitored by UV-vis. The concentration of the synthesized Ag NPs was measured by ICP-OES. Ag NP suspensions were acid digested with 67-70% nitric acid (Fisher Chemalert) prior to ICP-OES measurements. Silver concentrations in the sample were determined using a standard calibration curve that was plotted using known concentrations of silver solutions.

Fungal Strain, Medium and Growth Conditions

For Ag NP exposure experiments, $10^6$ spores of *A. parasiticus* were inoculated in 100 mL Yeast Extract Sucrose (YES) liquid growth medium containing Ag NPs at different concentrations (10 ng/mL, 25 ng/mL, 40 ng/mL, 50 ng/mL, 60 ng/mL, 75 ng/mL, and 100 ng/mL) and grown under standard growth condition (29° C. in the absence of light at 150 rpm). The untreated control groups were grown under the same growth conditions but in the absence of Ag NPs. Mycelia were harvested for analyses of growth, and the growth medium was analyzed for determination of aflatoxin accumulation in the growth medium at 24 h, 30 h, 40 h, and 48 h from the time point of inoculation. All experiments were performed in triplicates.

Fungal Growth and Aflatoxin Measurements

Dry weight measurements of harvested mycelia were performed. Briefly, at different time points, mycelia were harvested and stored at −800° C. The following day mycelia were incinerated in hot air oven (850 to 900° C.) for 8-10 hours. After 8 hours all material was collected and the dry weight was calculated by deducting the final weight (after incineration) from the initial weight (before incineration). Aflatoxin accumulation in the growth medium was determined using both thin-layer chromatography (TLC) and Enzyme Linked Immunosorbent Assay (ELISA).

Properties of the Ag NPs

Figure 20:
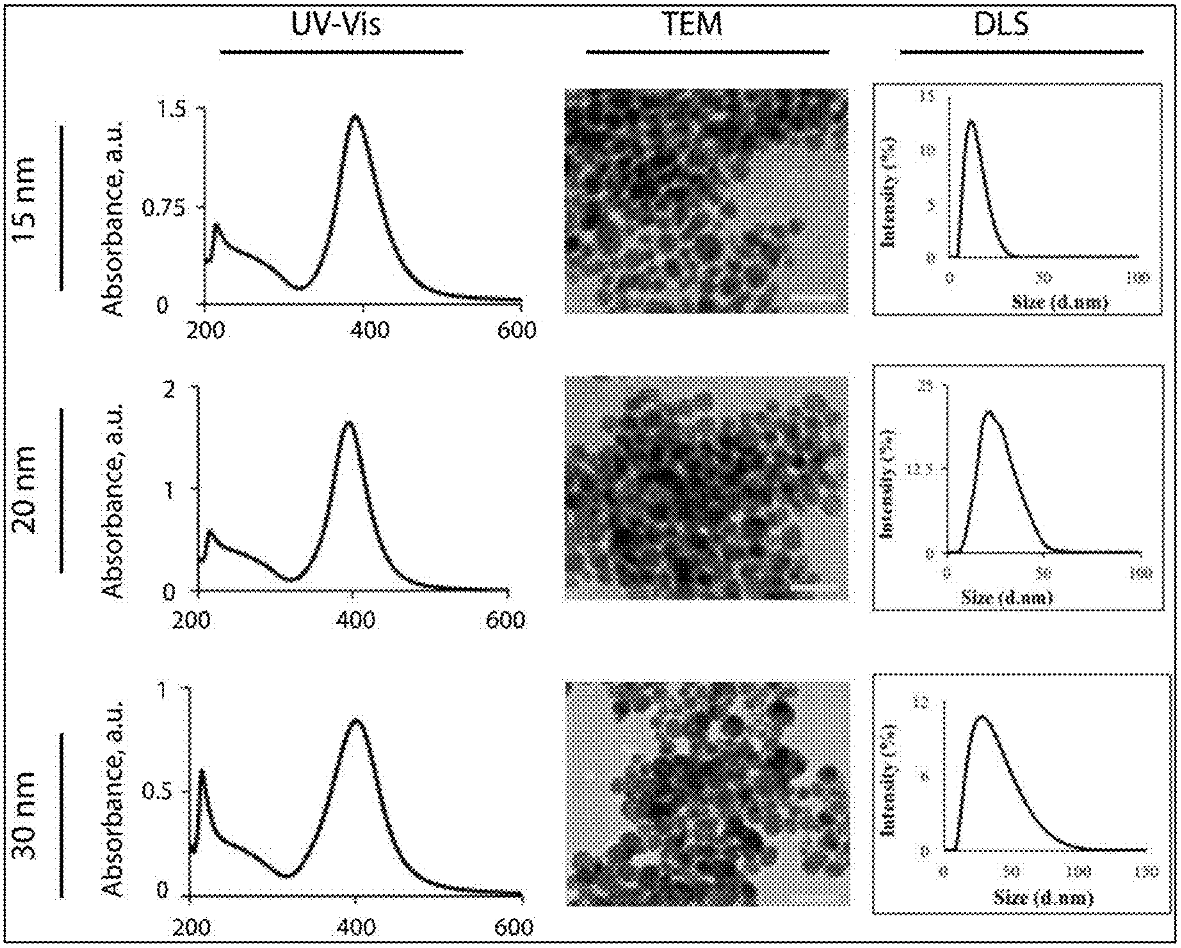
FIG. 20 presents characterizations of different sized cit-Ag NPs by surface plasmon UV-vis spectrophotometry, TEM and DLS. Scale Bar, 50 nm

The properties of the NPs are summarized in Table 2. The absorption specta for each NP, their representative TEM micrographs and their DLS data are shown in FIG. 20. The single peak centered on the $\lambda_{max}$ values for each NP were implicative of successful synthesis of NPs and showed no signs of Ag NP aggregates in the NP suspensions. TEM micrographs also confirmed that the NPs were present predominantly as single particles with average core sizes (revealed by TEM) summarized in Table 2 as mean±standard deviation, n=100. The average hydrodynamic diameter and size PDI as revealed by DLS confirmed a narrow size distribution for each suspension.

Figure 22:
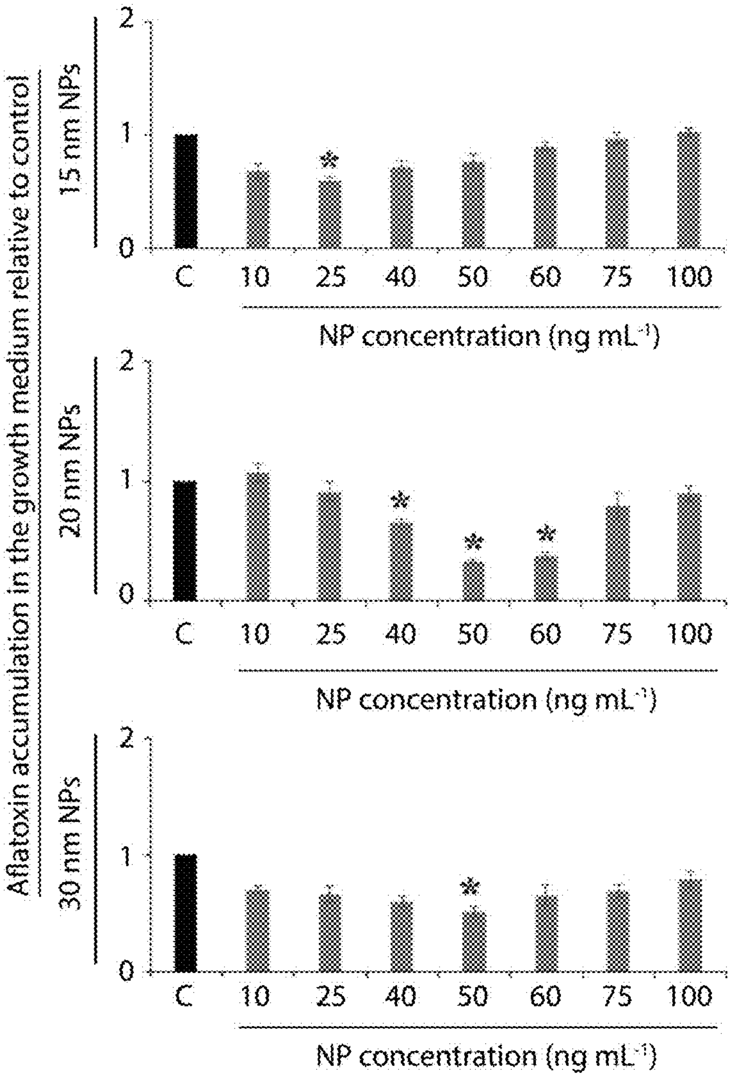
FIG. 22 graphically illustrates the effect of NP size on inhibition of aflatoxin biosynthesis by *A. parasiticus*. Statistical significance of two-tailed p-values was determined using an unpaired t-test, with n=3 and $p<0.05$ as the significance level. '*' denote significance.

Effect of Ag Np Size on Reduction in Aflatoxin Accumulation in the Growth Medium A series of different concentrations of NPs—10 ng mL$^{-1}$, 25 ng mL$^{-1}$, 40 ng mL, 50 ng mL, 60 ng mL$^{-1}$, 75 ng mL$^{-1}$, and 100 ng mL$^{-1}$—were used for studying the effect of NPs on aflatoxin biosynthesis. Aflatoxin accumulation in the growth medium at 40 h post inoculation was used to compare aflatoxin biosynthesis under different conditions. Aflatoxin accumulation normalized by dry weight of the mycelia at the same time point and relative fold difference was calculated as compared to the untreated control (C). The results shown in FIG. 22 revealed a non-linear relationship between NP concentration and the inhibition of aflatoxin accumulation. NPs sized 20 nm were most effective in inhibiting aflatoxin accumulation with significant reduction compared to the control in the concentration range of 40 ng mL$^{-1}$ to 60 ng mL$^{-1}$; maximum inhibition occurred at 50 ng mL$^{-1}$ (~3 fold reduction). Significant inhibition was observed only at 50 ng mL$^{-1}$ for the 30 nm NPs (~2 fold reduction). For 15 nm particles however, maximum aflatoxin inhibition (~1.7 fold) occurred at 25 ng mL$^{-1}$ after which, aflatoxin accumulation increased with increase Ag NP concentrations in the growth medium.

It is well documented that the size of nanoparticles has great effects on their uptake and impact on biological system. It is possible that smaller nanoparticles are readily taken up by the fungal cell during endocytosis. However, as nanoparticle sizes increase their uptake becomes more complicated and while thermodynamically possible, it occurs at a lower rate. It has previously been observed that Ag NPs strongly interact with the components of the fungal growth medium.

TABLE 2

| NP properties | Cit-Ag NP | Cit-Ag NP | Cit-Ag NP | PVP-Ag NP |
|---|---|---|---|---|
| | 15 nm | 20 nm | 30 nm | 20 nm |
| λ max from UV-vis | 391 nm | 395 nm | 403 nm | 396 nm |
| z average diameter (nm) | 15.11 ± 1.27 | 20.13 ± 0.95 | 30.42 ± 2.06 | 36.9 ± 0.8 |
| PDI | 0.184 ± 0.01 | 0.109 ± 0.03 | 0.252 ± 0.05 | 0.297 ± 0.04 |
| Average size by TEM (n = 100 particles) | 6.82 ± 2.61 | 13.8 ± 2.25 | 25.06 ± 5.92 | 19.56 ± 5.87 |
| ICPOES (ppb) | 9289.67 ± 236.9 | 9671.56 ± 100.04 | 9651.69 ± 96.83 | 18877.33 ± 241.93 |

Figure 21:
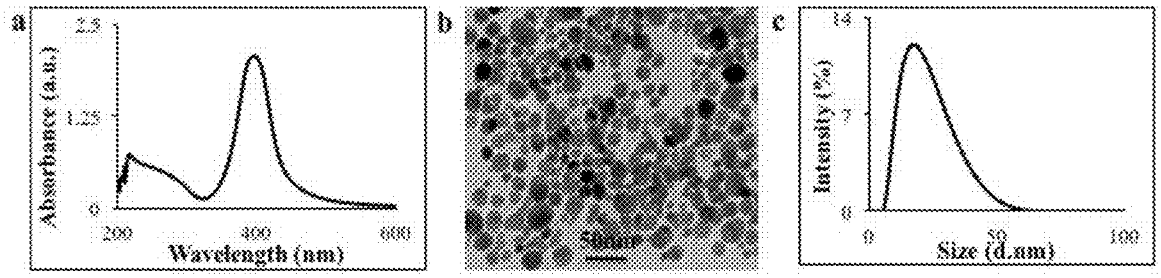
FIG. 21 presents characterization of polymer coated Ag NP of 20 nm size by (a) surface plasmon UV-vis spectrophotometry, peak at 403 nm, (b) representative TEM micrograph, scale bar, 50 nm, and (c) DLS data.

As an initial step of characterization of the NPs, the absorbance spectra of the freshly synthesized NPs were first analyzed using surface plasmon resonance UV-Vis spectrophotometry (wavelength 200 nm to 800 nm). This technique is sensitive towards the size of the nanoparticles; hence the SPR peaks shifted to longer wavelengths as the particle size increased. As shown in FIG. 20 and Table 2, the nanoparticle solutions demonstrated $\lambda_{max}$ values at 391 nm, 395 nm and 396 nm respectively, which was suggestive of the successful synthesis of respective silver nanospheres in the cit-Ag NP suspensions. The representative images of the nanoparticles as observed under TEM are shown in FIG. 20. The TEM images of all the Ag NPs indicated well-dispersed particles in the resulting suspension and that the particles were spherical in shape. Since DLS spectroscopy measures hydrodynamic size rather than a physical size, the size obtained by the DLS is larger than the size obtained by TEM (as shown in Table 2). The characterization of the commercially obtained PVP-Ag NPs also demonstrated the absorbance and size characteristics as expected in a well dispersed 20 nm PVP-Ag NP suspension (FIG. 21).

Figure 23:
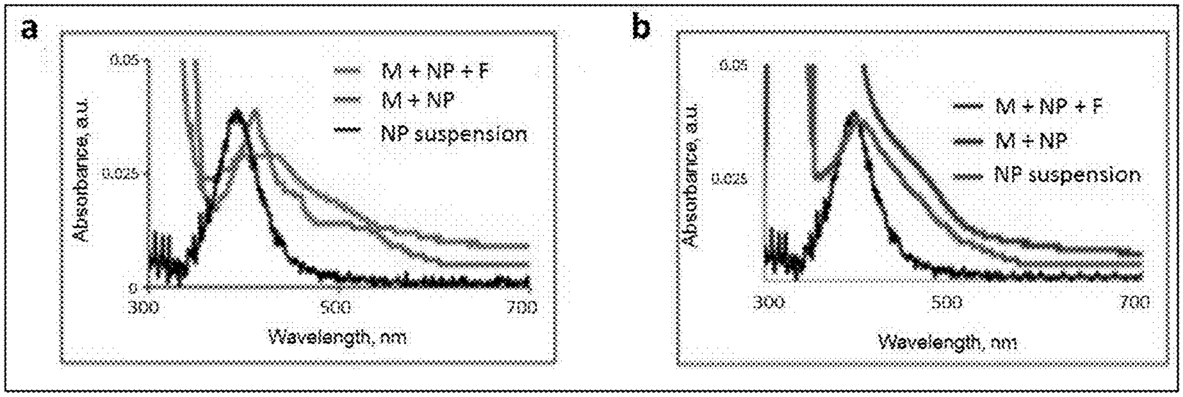
FIG. 23 illustrates the effect of NP concentration on the absorbance peak of the growth medium.

Spectral profiles of growth media spiked with two different concentrations (50 ng mL-1 and 100 ng mL-1) of cit-Ag NPs (M+NP) for 24 h were compared with that of the growth medium containing cit-Ag NPs at those concentrations and 24 h old growing mycelia (M+NP+F). These spectral profiles were compared to the that of the stock solution (NP suspension). Results are shown in FIG. 23. As can be seen, the interaction increased with increased concentration of NPs and the particles aggregated, precipitated or transformed quickly in the medium. Without wishing to be bound to any particular theory, it is possible that at higher concentrations maximum number of particles get aggregated and make them unavailable for mycelia to uptake.

Effect of NP Coating on Reduction in Aflatoxin Accumulation in the Growth Medium Commercially available polyvinyl pyrrolidone (PVP) coated nanoparticles were also examined. Aflatoxin accumulation was normalized by dry weight of the mycelia at 40 h and relative fold difference was calculated as compared to the untreated control (C).

Figure 24:
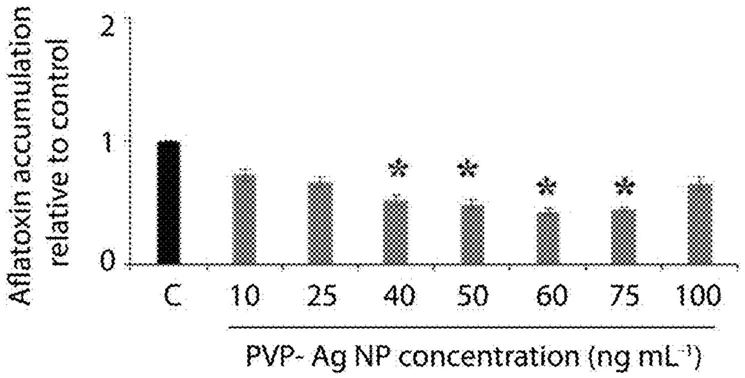
FIG. 24 graphically illustrates the effect of PVP-Ag NP sized 20 nm on aflatoxin reduction. Statistical significance of two-tailed p-values was determined using an unpaired t-test, with n=3 and $p<0.05$ as the significance level. '*' denote significance.

Results are shown in FIG. 24. As can be seen, aflatoxin expression reduction with PVP-Ag NPs sized 20 nm reached maxima at 60 ng/mL concentration (~2.3 fold) but 40 ng/mL (~1.9 fold), 50 ng/mL (2 fold), and 75 ng/mL (~2.2 fold) concentrations also showed significant amount of aflatoxin inhibitory effect in the growth medium, as compared to the untreated sample at 40-hour time post inoculation. These results suggest that compared to the same sized cit-Ag NPs the PVP-Ag NPs displayed a wider concentration range within which they could reduce aflatoxin production by 2 fold or higher. It is possible that PVP coating renders stability to the NPs in the growth medium and hence was able to inhibit aflatoxin biosynthesis for a wider concentration range. The higher stability of Ag NPs with PVP coating than citrate coating may in part be due to the be steric repulsion exhibited by PVP coating (the DLVO theory).

Figure 25:
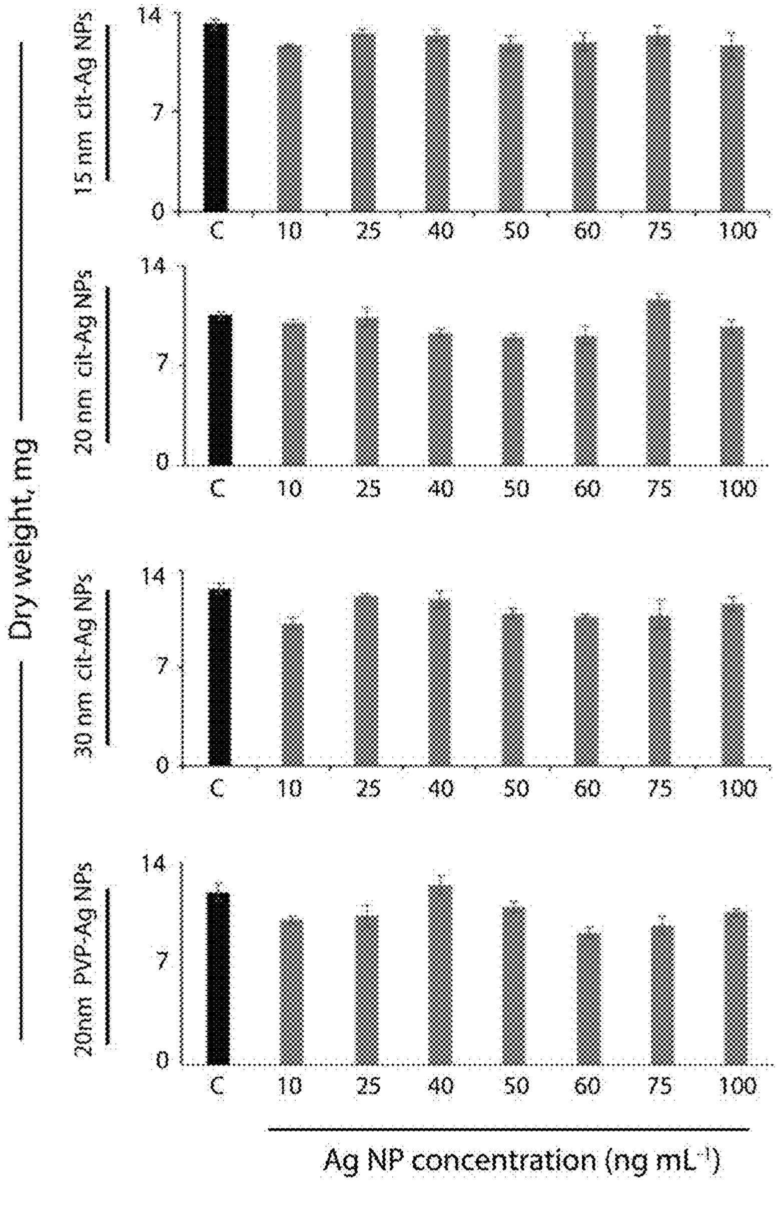
FIG. 25 graphically illustrates the effect of NPs on fungal growth. Statistical significance of two-tailed p-values was determined using an unpaired t-test, with n=3 and $p<0.05$ as the significance level.

Effect of Silver Nanoparticles and Silver Nitrate on Mycelial Growth:

Dry weight (measured as growth rate that is mg/h) of all the treated and untreated mycelia was measured to understand whether the observed aflatoxin inhibitory effect of the NPs was growth related. The results from dry weight analyses (FIG. 25) demonstrated that none of the NPs at the applied concentrations had any significant effect on fungal growth implying that the observed inhibitory effects on aflatoxin production were growth independent.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed is:

1. A method for inhibiting production of an aflatoxin in a fungus comprising:

forming a first suspension of silver nanoparticles, the silver nanoparticles comprising a surface coating, the coated silver nanoparticles having an average size of from 15 nanometers to 30 nanometers as determined by transmission electron microscopy;

separating the coated silver nanoparticles from the first suspension by ultrafiltration in a diafiltration mode;

redispersing the coated silver nanoparticles in a second suspension, the second suspension including the coated silver nanoparticles at a concentration of from 25 nanograms per milliliter to 60 nanograms per milliliter;

contacting the fungus with the second suspension, wherein during a period of time in which the fungus is in contact with the suspension, fungal aflatoxin production is inhibited with no significant decrease in fungal growth rate as expressed as dry weight accumulation per unit time of the contact.

2. The method of claim 1, wherein the fungus comprises a mycotoxin-producing filamentous fungus.

3. The method of claim 1, wherein the fungus comprises *Aspergillus parasiticus*.

4. The method of claim 1, the coated silver nanoparticles having an average size of 20 nanometers.

5. The method of claim 1, wherein the coating comprises a citrate.

6. The method of claim 1, wherein the coating comprises a polymer.

7. The method of claim 1, the method decreasing generation of reactive oxygen species by the fungus during the period of time of contact.

8. The method of claim 1, the method inhibiting transcription of one or more genes associated with aflatoxin biosynthesis during the period of time of contact.

9. The method of claim 1, the method inhibiting the global regulators of secondary metabolism laeA and veA during the period of time of contact.

10. The method of claim 1, the second suspension including the coated silver nanoparticles at a concentration of 50 nanograms per milliliter.

11. The method of claim 6, wherein the coating comprises polyvinyl pyrrolidone.

12. The method of claim 1, wherein the second suspension includes the coated silver nanoparticles at a concentration of from 40 nanograms per milliliter to 60 nanograms per milliliter.

13. The method of claim 1, wherein the second suspension includes the coated silver nanoparticles at a concentration of 25 nanograms per milliliter.

* * * * *